US011972724B1

(12) United States Patent
de Jesus Gomes Leandro et al.

(10) Patent No.: US 11,972,724 B1
(45) Date of Patent: *Apr. 30, 2024

(54) METHODS OF DISPLAY BRIGHTNESS CONTROL AND CORRESPONDING ELECTRONIC DEVICES

(71) Applicant: Motorola Mobility LLC, Chicago, IL (US)

(72) Inventors: Jorge de Jesus Gomes Leandro, Sao Paulo (BR); Luana Felipe de Barros, Cosmopolis (BR); Thiago Francisco Martins, Indaiatuba (BR); Francisca Sancha Azevedo da Silva, Manaus (BR)

(73) Assignee: Motorola Mobility LLC, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/121,989

(22) Filed: Mar. 15, 2023

Related U.S. Application Data

(63) Continuation of application No. 17/965,547, filed on Oct. 13, 2022, now Pat. No. 11,705,062.

(51) Int. Cl.
*G09G 3/3225* (2016.01)

(52) U.S. Cl.
CPC ... *G09G 3/3225* (2013.01); *G09G 2320/0626* (2013.01); *G09G 2354/00* (2013.01); *G09G 2360/06* (2013.01); *G09G 2360/144* (2013.01)

(58) Field of Classification Search
CPC ........... G09G 2360/06; G09G 2354/00; G09G 2320/0626; G09G 3/3225; G09G 2360/144
See application file for complete search history.

(56) References Cited

U.S. PATENT DOCUMENTS 5,760,760 A 6/1998 Helms
8,223,117 B2 7/2012 Ferguson
11,705,062 B1 * 7/2023 de Jesus Gomes Leandro ........... G09G 3/3225 345/207
2006/0092182 A1 5/2006 Diefenbaugh et al.
2006/0256067 A1 11/2006 Montero et al.
2011/0050719 A1 3/2011 Diefenbaugh et al.
2017/0358275 A1 12/2017 Klement
2020/0314985 A1 10/2020 Degris et al.

OTHER PUBLICATIONS

Abdulselam, Abbas I. , "Notice of Allowance", U.S. Appl. No. 17/965,547, filed Oct. 13, 2023; dated Mar. 8, 2023.

(Continued)

*Primary Examiner* — Abbas I Abdulselam
(74) *Attorney, Agent, or Firm* — Philip H. Burrus, IV

(57) ABSTRACT

A method for an electronic device merges a subset of display brightness and corresponding ambient light value pairs selected from a brightness adjustment model and one or more user defined display brightness and corresponding ambient light value pairs received from user input occurring at a user interface of the electronic device to obtain a merged brightness adjustment model dataset. The method filters the merged brightness adjustment model dataset to obtain a filtered brightness adjustment model dataset and extracts a merged brightness adjustment model from the filtered brightness adjustment model dataset. One or more processors of the electronic device control a display brightness of a display of the electronic device using the merged brightness adjustment model.

20 Claims, 13 Drawing Sheets

(56) References Cited

OTHER PUBLICATIONS

Abeywardhane, et al., "Optimization of Volume and Brightness of ANdroid Smartphone though Clustering and Reinforcement Learning ("RE-IN")", Publication Nov. 28, 2019; Available online at https://ieeexplore.ieee.org/document/8913391.
Draa, et al., "Device Context Classification for Mobile Power Consumption Reduction", Published online Oct. 27, 2016; Available online at https://ieeexplore.ieee.org/document/7723620.
Draa, et al., "ENOrMOUS: Eergy Optimization for Mobile plateform using User Needs", Published Oct. 2, 2018; Available Online at https://www.sciencedirect.com/science/article/pii/S1383762118300705.
Hong, et al., "Automatic Display Brightness Control with Multiple Sensors", Published Oct. 17, 2019; Available online at https://www.tdcommons.org/dpubs_series/2573,.
Price, et al., "Machine Learning to Select Screen Brightness Level", Available online at http://www.tdcommons.org/dpubs_series/932 ; Published Dec. 12, 2017.
Sarsenbayeva, et al., "Effect of Ambient Light on Mobile Interaction", Published Aug. 2019; Available online at https://www.researchgate.net/publication/335380481_Effect_of_Ambient_Light_on_Mobile_Interaction.
Schuchhardt, et al., "CAPED: Context-aware Personalized Display Brightness for Mobile Devices", Published online Jan. 8, 2015; Available at https://ieeexplore.ieee.org/document/6972472.
Schuchhardt, et al., "Optimizing Mobile Display Brightness by Leveraging Human Visual Perception", Published online Nov. 12, 2015; Available at https://ieeexplore.ieee.org/document/7324538.

* cited by examiner

1600
$$\begin{cases} wi = \frac{P(x)}{F(x)-P(x)} + 1, F(x) - P(x) > P(x) \\ \frac{F(x)-P(x)}{P(x)}, F(x) - P(x) \leq P(x) \end{cases}$$
FIG. 16
1700
$$O(x) = \frac{wi}{2} \times F(x) + \frac{wi}{2} \times I(x) + \frac{1-wi}{2} \times P(x) + \frac{1-wi}{2} \times D(x)$$
FIG. 17
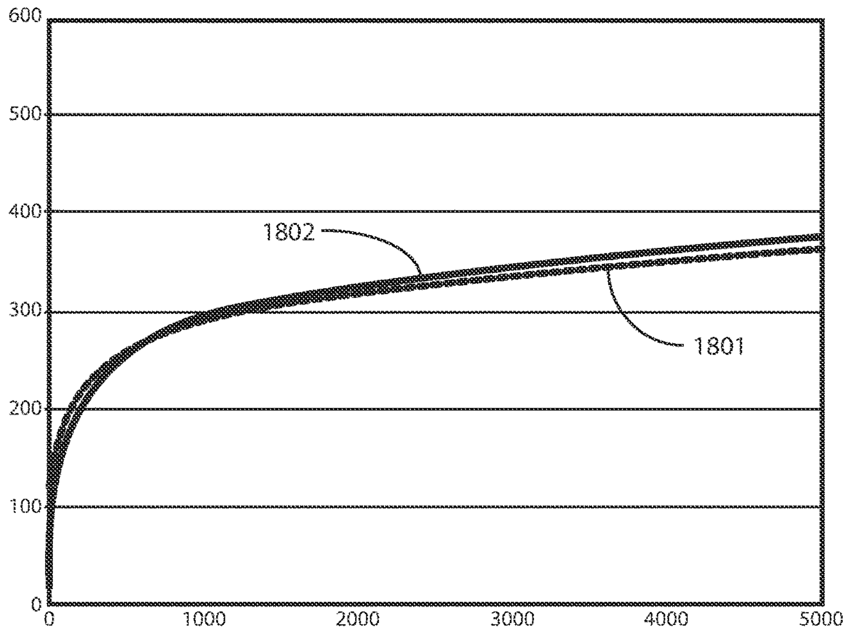
FIG. 18
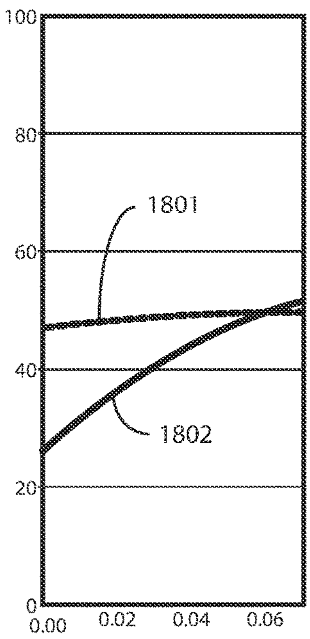
FIG. 19

METHODS OF DISPLAY BRIGHTNESS CONTROL AND CORRESPONDING ELECTRONIC DEVICES

CROSS REFERENCE TO PRIOR APPLICATIONS

This application is a continuation application claiming priority and benefit under 35 U.S.C. § 120 from U.S. application Ser. No. 17/965,547, filed Oct. 13, 2022, which is incorporated by reference for all purposes.

BACKGROUND

Technical Field

This disclosure relates generally to electronic devices, and more particularly to electronic devices having displays.

Background Art

Portable electronic device usage has become ubiquitous. Vast majorities of the population carry a smartphone, tablet computer, or laptop computer daily to communicate with others, stay informed, to consume entertainment, and to manage their lives.

As the technology incorporated into these portable electronic devices has become more advanced, so too has their feature set. A modern smartphone includes more computing power than a desktop computer of only a few years ago. Additionally, while early generation portable electronic devices included physical keypads, most modern portable electronic devices include touch-sensitive displays. It would be advantageous to have an improved electronic device utilizing methods for adjusting the display settings to improve the user experience.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present disclosure.

FIG. 16 illustrates one explanatory weighting algorithm portion in accordance with one or more embodiments of the disclosure.

FIG. 17 illustrates one explanatory weighting algorithm portion in accordance with one or more embodiments of the disclosure.

FIG. 18 illustrates a comparison of two different filtering techniques used to obtain a merged brightness adjustment model dataset in accordance with one or more embodiments of the disclosure.

FIG. 19 illustrates the low-light portion of FIG. 18.

Figure 1:
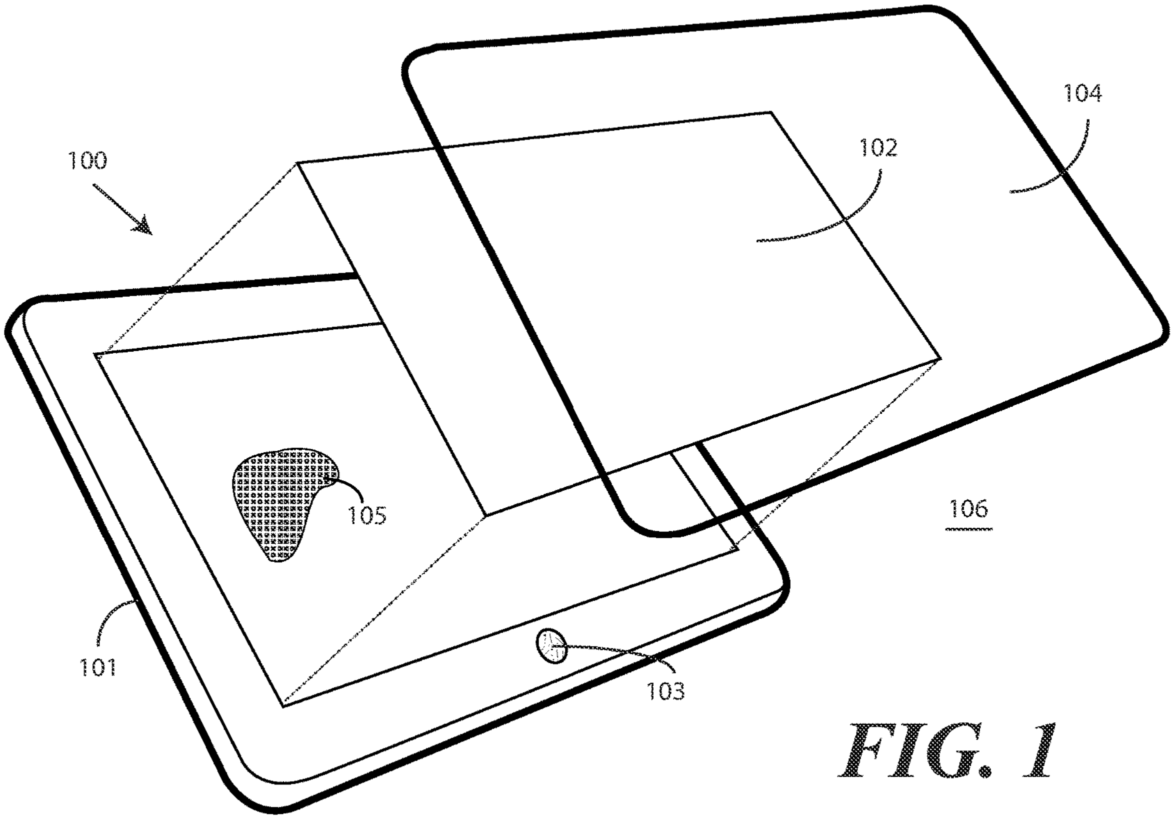
FIG. 1 illustrates one explanatory electronic device in accordance with one or more embodiments of the disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

DETAILED DESCRIPTION OF THE DRAWINGS

Before describing in detail embodiments that are in accordance with the present disclosure, it should be observed that the embodiments reside primarily in combinations of method steps and apparatus components related to extracting a merged brightness adjustment model from a filtered merged brightness adjustment model dataset and controlling, using one or more processors of an electronic device, a display brightness using the merged brightness adjustment model. Any process descriptions or blocks in flow charts should be understood as representing modules, segments, or portions of code which include one or more executable instructions for implementing specific logical functions or steps in the process. Alternate implementations are included, and it will be clear that functions may be executed out of order from that shown or discussed, including substantially concurrently or in reverse order, depending on the functionality involved. Accordingly, the apparatus components and method steps have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

Embodiments of the disclosure do not recite the implementation of any commonplace business method aimed at processing business information, nor do they apply a known business process to the particular technological environment of the Internet. Moreover, embodiments of the disclosure do not create or alter contractual relations using generic computer functions and conventional network operations. Quite to the contrary, embodiments of the disclosure employ methods that, when applied to electronic device and/or user interface technology, improve the functioning of the electronic device itself by and improving the overall user experience to overcome problems specifically arising in the realm of the technology associated with electronic device user interaction.

It will be appreciated that embodiments of the disclosure described herein may be comprised of one or more conventional processors and unique stored program instructions that control the one or more processors to implement, in conjunction with certain non-processor circuits, some, most, or all of the functions of combining some display brightness values corresponding to some ambient light values selected from a previously generated brightness adjustment model stored in memory with at least one user defined display brightness and at least one sensed ambient light value to obtain a merged brightness adjustment model that is a non-decreasing, monotonic function for a set of increasing ambient light values, and adjusting a display brightness level as a function of a sensed ambient light level measured by a light sensor and the merged brightness adjustment model as described herein. The non-processor circuits may include, but are not limited to, light sensors, a radio receiver, a radio transmitter, signal drivers, clock circuits, power source circuits, and user input devices. As such, these functions may be interpreted as steps of a method to perform combining a subset of display brightness and ambient light value pairs to obtain a combined brightness adjustment model dataset, filtering the combined brightness adjustment model dataset to obtain a filtered merged brightness adjustment model dataset, extracting a merged brightness adjustment model from the filtered merged brightness adjustment model dataset, and controlling an output brightness of an electronic device as a function of the merged brightness adjustment model. Alternatively, some or all functions could be implemented by a state machine that has no stored program instructions, or in one or more application specific integrated circuits (ASICs), in which each function or some combinations of certain of the functions are implemented as custom logic.

Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ASICs with minimal experimentation.

Embodiments of the disclosure are now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on." Relational terms such as first and second, top and bottom, and the like may be used solely to distinguish one entity or action from another entity or action without necessarily requiring or implying any actual such relationship or order between such entities or actions.

As used herein, components may be "operatively coupled" when information can be sent between such components, even though there may be one or more intermediate or intervening components between, or along the connection path. The terms "substantially," "essentially," "approximately," "about," or any other version thereof, are defined as being close to as understood by one of ordinary skill in the art, and in one non-limiting embodiment the term is defined to be within ten percent, in another embodiment within five percent, in another embodiment within one percent and in another embodiment within one-half percent. The term "coupled" as used herein is defined as connected, although not necessarily directly and not necessarily mechanically. Also, reference designators shown herein in parenthesis indicate components shown in a figure other than the one in discussion. For example, talking about a device (10) while discussing figure A would refer to an element, 10, shown in figure other than figure A.

As noted above, electronic devices having displays that function as their primary user interfaces have become ubiquitous. While electronic devices not too long ago had physical keypads and controls, today most all smartphones, tablet computers, and similar devices utilize a touch-sensitive display as their main user interface. The majority of these devices use displays that project light from the electronic device, through or from pixels or other image defining structures, out to the user's eyes. In contrast to reflective displays such as "e-ink" or other similar technologies, the overall brightness of these light-emitting displays can be adjusted. For instance, many users prefer a lesser amount of display light in dim environments and prefer greater amounts of display light in brighter environments.

Some electronic devices are able to "adaptively" adjust the brightness of their displays. Such devices use a light sensor to measure an amount of ambient light, and then automatically adjust the display brightness level in accordance with the ambient light value. Google.sup.™ even offers an open-source software solution called Turbo.sup.™ that provides one technique for implementing adaptive brightness features in Android.sup.™ devices.

While Turbo.sup.™ works adequately in practice, it and other similar adaptive brightness solutions are not without certain drawbacks. Illustrating by example, some countries actually have legal restrictions in place that prevent the use of such adaptive brightness systems all together. What's more, some of these algorithms can be slow to adjust to user preferences, can consume excessive amounts of battery capacity, and are unable to be implemented or respond "on the fly." For instance, some adaptive brightness algorithms can take over a week to adjust to user-defined input changing a brightness preference. They can also become non-responsive at times to user requests.

Advantageously, embodiments of the present disclosure provide an improved adaptive brightness system that solves these problems. In one or more embodiments, a method in an electronic device comprises merging a subset of display brightness and corresponding ambient light value pairs selected from a brightness adjustment model defining a plurality of display brightness values corresponding to a plurality of ambient light values on a one-to-one basis that is stored in a memory of the electronic device with one or more user defined display brightness and corresponding ambient light value pairs received from user input occurring at a user interface of the electronic device to obtain a merged brightness adjustment model dataset. In one or more embodiments, the method then filters the merged brightness adjustment model dataset to obtain a filtered merged brightness adjustment model dataset. A merged brightness adjustment model is then extracted from the filtered merged brightness adjustment model dataset. In one or more embodiments, one or more processors of an electronic device then control a display brightness of a display of the electronic device using the merged brightness adjustment model.

Advantageously, this method—as well as others described below—provide a much faster convergence between the merged brightness adjustment model and user input adjusting preferred display brightness settings. Embodiments of the disclosure also remain fully responsive to any, and all, user requests for display brightness adjustments. In contrast to prior art display brightness adjustment systems, embodiments of the disclosure can be trained "on the fly" after a single user interaction requesting a display brightness adjustment.

One of the primary advantages offered by embodiments of the disclosure is that the methods, when implemented in an electronic device to control the display brightness of the display, require far less computational processing power than do prior art methods. Other advantages will be described below. Still others will be obvious to those of ordinary skill in the art having the benefit of this disclosure.

In one or more embodiments, an electronic device comprises a light sensor measuring ambient light levels within an environment of the electronic device and a memory storing a previously generated brightness adjustment model. In one or more embodiments, the brightness adjustment model defines a plurality of display brightness and corresponding ambient light value pairs that correspond on a one-to-one basis. In one or more embodiments, the electronic device includes a user interface that receives user input defining at least one preferred user display brightness for at least one sensed ambient light value detected by a light sensor.

In one or more embodiments, one or more processors then combine, optionally using an isotonic regression model, some display brightness values corresponding to some ambient light levels selected from the brightness adjustment model with the at least one user defined display brightness and the at least one corresponding sensed ambient light value to obtain a merged brightness adjustment model. In one or more embodiments, the merged brightness adjustment model is a non-decreasing, monotonic function for a set of increasing ambient light values. In one or more embodiments, the one or more processors then adjust the display brightness level as a function of a sensed ambient light level measured by the light sensor and a corresponding brightness level selected from the merged brightness adjustment model.

This technique, implemented in an electronic device by the one or more processors to control display brightness, provides a novel system and signal flow that automatically predicts a user's preferred level of display brightness (typically measured in units called "nits" from the Latin "nitere," which means "to shine") for a measured ambient light level (typically measured in a unit of illuminance referred to as a "lux," which is one lumen of light per square meter). In its simplest form, the technique includes obtaining several reference points from a previously generated brightness adjustment model, referred to as "display brightness and corresponding ambient light value pairs," and merging those with user interactions adjusting a display brightness preference, referred to as "user defined display brightness and corresponding ambient light value pairs."

This merging, which is performed using an isotonic regression to preserve non-decreasing monotonicity in one or more embodiments, can be filtered to "smooth" the otherwise generally piecewise linear output of the merging operation to obtain a filtered merged brightness adjustment model dataset. In one or more embodiments, a one-dimensional Gaussian convolution model is used to perform the filtering. As will be described below with reference to FIGS. 15-19, in other embodiments other techniques can be used to perform the filtering. Illustrating by example, in another embodiment the filtering comprises applying an average of even instances of the merged brightness adjustment model dataset and odd instances of the merged brightness adjustment model dataset to obtain the filtered merged brightness adjustment model dataset.

Thereafter, one or more processors of the electronic device can extract a merged brightness adjustment model from the filtered merged brightness adjustment model dataset. In one or more embodiments, this comprises fitting the data from the filtered merged brightness adjustment model dataset using a monotonic cubic spline. Once the merged brightness adjustment model is obtained, the one or more processors can control the display brightness of its display using the merged brightness adjustment model. In one or more embodiments, the one or more processors do this by obtaining a sensed ambient light level from a light sensor, referencing the merged brightness adjustment model to determine a corresponding display brightness, and then causing the light of the display—or the display itself—to adjust its brightness to the referenced display brightness from the merged brightness adjustment model.

Using this technique, the isotonic regression algorithm works in tandem with filtering, be it via a Gaussian filter, a weighted filter, or other type of filter, to create a new, merged dataset from a previous brightness adjustment model and user interaction data adjusting display brightness preferences. Thereafter, an interpolation model such as a monotonic cubic spline can be fitted to the generated dataset. This resulting "fitted" model can then be used to automatically predict a user-desired display brightness level for a sensed ambient light level. Accordingly, one or more processors of an electronic device can control the display brightness of its display using the merged brightness adjustment model for a given ambient light level.

Turning now to FIG. 1, illustrated therein is one e explanatory electronic device 100 configured in accordance with one or more embodiments of the disclosure. The electronic device 100 of FIG. 1 is a portable electronic device and is shown as a tablet computer for illustrative purposes. However, it should be obvious to those of ordinary skill in the art having the benefit of this disclosure that other electronic devices may be substituted for the explanatory smart phone of FIG. 1. For example, the electronic device 100 could equally be a conventional desktop computer, a digital camera, a palm-top computer, a smartphone, a gaming device, a media player, or other device. The electronic device 100 could also be a wearable device, such as a smart watch, pendant, or other wearable device.

This illustrative electronic device 100 is shown in FIG. 1 in a partially exploded view so that various components can more clearly be seen. The electronic device 100 includes a housing 101, a display 102, an imager 103, and a fascia 104. In this illustrative embodiment, the imager 103 and the display 102 are adjacent. However, in other embodiments, the imager 103 can be situated beneath the display 102. To accommodate the latter positioning, in some embodiments the display 102 comprises an active-matrix organic light emitting diode (AMOLED) display that is fabricated on an optically transparent substrate. However, it should be noted that other types of displays employing transparent substrates will be obvious to those of ordinary skill in the art having the benefit of this disclosure.

Starting from the top, a fascia 104 is provided. In this illustrative embodiment, the fascia 104 defines a major face of the housing 101 disposed above the display. The fascia 104 may be manufactured from glass or a thin film sheet. The fascia 104 is a covering or housing, which may or may not be detachable. Suitable materials for manufacturing the cover layer include clear or translucent plastic film, glass, plastic, or reinforced glass. Reinforced glass can comprise glass strengthened by a process such as a chemical or heat treatment. The fascia 104 may also include an ultra-violet barrier. Such a barrier is useful both in improving the visibility of display 102 and in protecting internal components of the electronic device 100.

Printing may be desired on the front face of the fascia 104 for various reasons. For example, a subtle textural printing or overlay printing may be desirable to provide a translucent matte finish atop the fascia 104. Such a finish is useful to prevent cosmetic blemishing from sharp objects or fingerprints. The fascia 104 can include a plurality of indium tin oxide or other electrodes, which function as a capacitive sensor, to convert the display 102 to a touch-sensitive display. Where configured to be touch sensitive, users can deliver user input to the display 102 by delivering touch input from a finger, stylus, or other objects disposed proximately with the display.

Beneath the fascia 104 is disposed the display 102. The display 102 is supported by the housing 101 of the electronic device 100. In one embodiment, the display 102 comprises an organic light emitting diode (OLED) display. One or more active elements 105 can be operable to project light outwardly from the housing 101 of the electronic device 100 and through the fascia 104 to a user. Illustrating by example, if the display 102 is an OLED display, each active element 105 can be configured as a single OLED. When a voltage is applied to the OLED, the resulting current moves electrodes and holes to cause light emission. By contrast, where the display 102 is a traditional light emitting display, the one or more active elements 105 may be pixels of a backlight that project light through liquid crystal elements to cause light to be emitted through the fascia 104 to the eyes of a user. In one or more active elements 105 are controllable such that the overall display brightness can be adjusted to a desired level by one or more processors of the electronic device 100.

In one embodiment, the imager 103 comprises a digital camera. The imager 103 could alternatively comprise multiple cameras that are proximately disposed with the display 102. Where multiple cameras are used as the imager 103, these cameras can be oriented along the electronic device 100 spatially in various ways. Illustrating by example, in one embodiment the cameras can be clustered near one another. In another embodiment, the cameras can be oriented spatially across the surface area defined by the display 102, e.g., with one camera in the center and four other cameras, with one camera disposed in each of the four corners of the housing 101.

Where multiple cameras are used, the one or more processors can capture and record the ambient light level of the environment 106 around the electronic device 100. In other embodiments, the imager 103 can be replaced by a simple light sensor. In still other embodiments, a light sensor can be used in addition to the imager 103 to determine ambient light levels.

One or more processors of the electronic device 100 can then use this information to adjust the display brightness of the display 102 by changing the amount of light the one or more active elements 105 (be they OLEDs, a backlight, or other type of element) emit through the fascia 104 to the eyes of a user. In some embodiments, the one or more processors can use the ambient light level to adjust other display parameters, such as by modifying the levels of the display output, e.g., color intensity and color balance, as a function of pixel locations on the display 102 to brighten dark corners (relative to the center), align consistent color balance, and so forth, thereby improving image quality in a real time, closed-loop feedback system.

In one embodiment, the imager 103 is capable of each of metering scenes to adjust its settings, capturing images, and previewing images. When images are captured, the captured image is recorded to memory. When images are previewed, the images are delivered to the one or more processors of the electronic device for presentation on the display 102. When previewing images, the images can either be temporarily written to memory or delivered directly to the display 102 as electronic signals with only temporary buffering occurring in the one or more processors.

This explanatory electronic device 100 also includes a housing 101. Features can be incorporated into the housing 101. Examples of such features include a microphone or speaker port. A user interface component, which may be a button or touch sensitive surface, can also be disposed along the housing 101.

Figure 2:
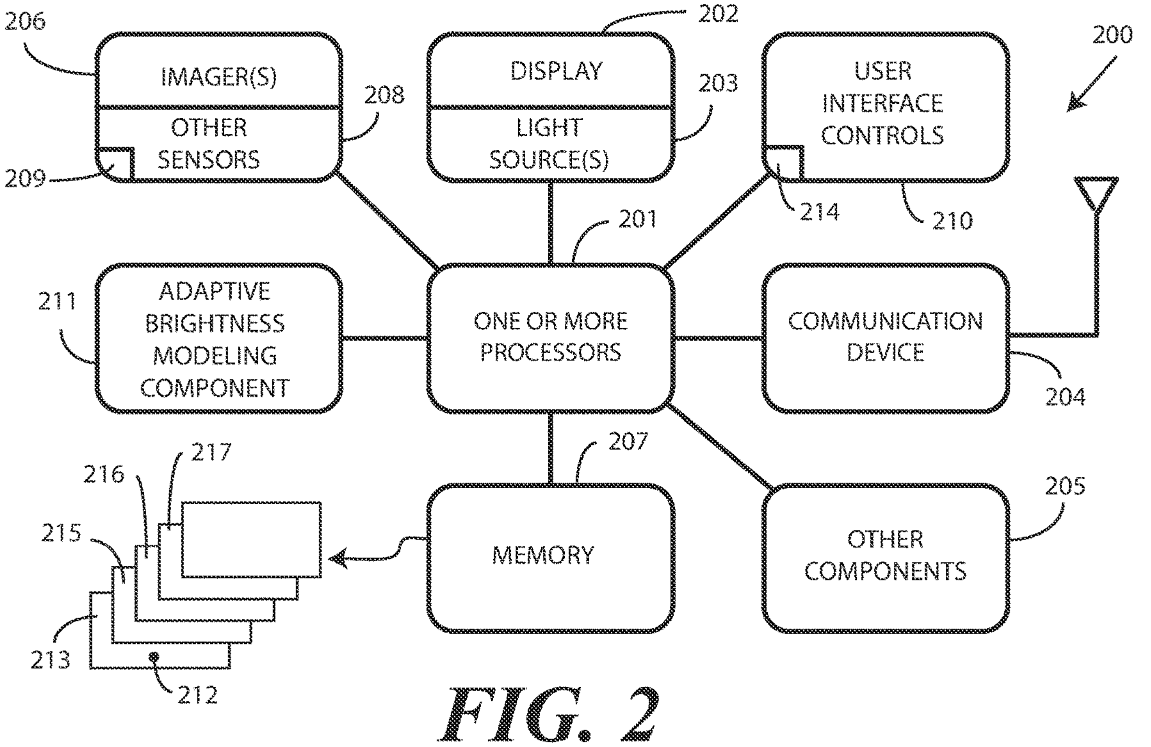
FIG. 2 illustrates a block diagram schematic of one explanatory electronic device in accordance with one or more embodiments of the disclosure.

Turning now to FIG. 2, illustrated therein is a schematic block diagram 200 of an explanatory electronic device configured in accordance with one or more embodiments of the disclosure. In one or more embodiments, the schematic block diagram 200 includes a display 202. One or more processors 201 can be operable with the display 202 and can specifically alter a display brightness associated with the display 202 in one or more embodiments.

In one or more embodiments, the display 202 may optionally be touch-sensitive. In one embodiment where the display 202 is touch-sensitive, the display 202 can serve as a primary user interface for an electronic device. Users can deliver user input to the display 202 of such an embodiment by delivering touch input from a finger, stylus, or other objects disposed proximately with the display 202. In one embodiment, the display 202 is configured as an active-matrix organic light emitting diode (AMOLED) display. However, it should be noted that other types of displays, including liquid crystal displays, OLED displays, twisted nematic displays, light emitting diode displays, and so forth could be used and would be obvious to those of ordinary skill in the art having the benefit of this disclosure.

In one or more embodiments, one or more processors 201 are operable with the display 202 and other components of the electronic devices configured in accordance with embodiments of the disclosure. The one or more processors 201 can include a microprocessor, a group of processing components, one or more ASICs, programmable logic, or other type of processing device. The one or more processors 201 can be operable with the various components of the electronic devices configured in accordance with embodiments of the disclosure. The one or more processors 201 can be configured to process and execute executable software code to perform the various functions of the electronic devices configured in accordance with embodiments of the disclosure.

A storage device, such as memory 207, can optionally store the executable software code used by the one or more processors 201 during operation. The memory 207 may include either or both static and dynamic memory components, may be used for storing both embedded code and user data. The software code can embody program instructions and methods to operate the various functions of the electronic device devices configured in accordance with embodiments of the disclosure, and also to execute software or firmware applications and modules. The one or more processors 201 can execute this software or firmware, and/or interact with modules, to provide device functionality.

In this illustrative embodiment, the schematic block diagram 200 also includes an optional communication circuit 204 that can be configured for wired or wireless communication with one or more other devices or networks. The networks can include a wide area network, a local area network, and/or personal area network. The communication circuit 204 may also utilize wireless technology for communication, such as, but are not limited to, peer-to-peer or ad hoc communications such as HomeRF, Bluetooth and IEEE 802.11, and other forms of wireless communication such as infrared technology. The communication circuit 204 can include wireless communication circuitry, one of a receiver, a transmitter, or transceiver, and one or more antennas.

The one or more processors 201 can also be operable with other components 205. The other components 205 can include an acoustic detector, such as a microphone. The other components 205 can also include one or more proximity sensors to detect the presence of nearby objects. The other components 205 may include video input components such as optical sensors, mechanical input components such as buttons, touch pad sensors, touch screen sensors, capacitive sensors, motion sensors, and switches. Similarly, the other components 205 can include output components such as video, audio, and/or mechanical outputs. Other examples of output components include audio output components such as speaker ports or other alarms and/or buzzers and/or a mechanical output component such as vibrating or motion-based mechanisms. The other components 205 may further include an accelerometer to show vertical orientation, constant tilt and/or whether the device is stationary.

The display 202 can be operable with one or more light sources 203 that are operable to project light to the eyes of a user. As noted above, where the display 202 comprises an OLED or AMOLED display, the light sources 203 can comprise OLEDs or AMOLEDs that are active to project light. In other display technologies, such as light emitting diode or twisted nematic displays, the one or more light sources 203 may comprise a backlight, a pixelated backlight, or other lighting apparatus operable to project light. In one or more embodiments, the one or more light sources 203 are adjustable so that the display brightness of the display 202 can be controlled by the one or more processors 201.

The imager 206 can be configured as an "intelligent" imager that captures one or more images from an environment of an electronic device into which the schematic block diagram 200 is situated. The intelligent imager can then determine whether objects within the images match predetermined criteria using object recognition or other techniques. For example, an intelligent imager can operate as an identification module configured with optical recognition such as include image recognition, character recognition, visual recognition, facial recognition, color recognition, shape recognition and the like. Advantageously, the intelligent imager can be used as a facial recognition device to detect the presence of a face of a subject, as well as whether that face is clearly depicted in the images captured by the intelligent imager or whether the face is at least partially obscured.

Illustrating by example, in one embodiment the intelligent imager can capture one or more photographs of a person. The intelligent imager can then compare the images to a reference file stored in memory to confirm beyond a threshold probability that the person's face sufficiently matches the reference file, One or more sensors 208 can be operable with the one or more processors 201. The one or more sensors 208 may include a microphone, an earpiece speaker, and/or a second loudspeaker. The one or more other sensors 208 may also include touch actuator selection sensors, proximity sensors, a touch pad sensor, a touch screen sensor, a capacitive touch sensor, and one or more switches. The other sensors 208 can also include audio sensors and video sensors (such as a camera).

Illustrating by example, in one or more embodiments the one or more sensors 208 comprise a gaze detector. The gaze detector can comprise sensors for detecting the user's gaze point. Electronic signals can then be delivered from the sensors to a gaze detection processing engine for computing the direction of user's gaze in three-dimensional space. The gaze detector can further be configured to detect a gaze cone corresponding to the detected gaze direction, which is a field of view within which the user may easily see without diverting their eyes or head from the detected gaze direction. The gaze detector can be configured to alternately estimate gaze direction by inputting to the gaze detection processing engine images representing one or more photographs of a selected area near or around the eyes. Other techniques for detecting gaze will be obvious to those of ordinary skill in the art having the benefit of this disclosure.

The one or more sensors 208 can also include a light sensor 209. In one or more embodiments, the light sensor 209 can detect changes in optical intensity, color, light, or shadows from the environment of the electronic device into which the schematic block diagram 200 is operational. In one or more embodiments, the light sensor 209 can measure an ambient light level in accordance with a predefined unit, one example of which is a lux. The light sensor 209 can measure ambient light values as well. An infrared sensor can be used in conjunction with, or in place of, the light sensor 209 in one or more embodiments. Similarly, a temperature sensor can be included with the one or more sensors 208 to monitor temperature about an electronic device.

The one or more processors 201 can be responsible for performing the primary functions of the electronic devices configured in accordance with one or more embodiments of the disclosure. For example, in one embodiment the one or more processors 201 comprise one or more circuits operable with one or more user interface controls 210, which can include the display 202, to present presentation information to a user. The executable software code used by the one or more processors 201, optionally stored in the memory 207, can be configured as one or more modules that are operable with the one or more processors 201. Such modules can store instructions, control algorithms, and so forth.

In one embodiment, these modules include an adaptive brightness modeling component 211. In one embodiment, the adaptive brightness modeling component 211 comprises software stored in the memory 207. However, in another embodiment the adaptive brightness modeling component 211 can comprise hardware components or firmware components integrated into the one or more processors 201 as well.

In one or more embodiments, the adaptive brightness modeling component 211 is operable with the user interface controls 210, the imager 206, and or the light sensor 209. The adaptive brightness modeling component 211 is also operable with the one or more processors 201. In some embodiments, the one or more processors 201 can control adaptive brightness modeling component 211. In other embodiments, the adaptive brightness modeling component 211 can operate independently, merging a subset of display brightness and corresponding ambient light value pairs 212 selected from a brightness adjustment model 213 stored in the memory 207 with one or more user defined display brightness and corresponding ambient light value pairs 214 to obtain a merged brightness adjustment model dataset 215, filtering the merged brightness adjustment model dataset 215 to obtain a filtered merged brightness adjustment model dataset 216, and extracting a merged brightness adjustment model 217 from the filtered merged brightness adjustment model dataset 216 so that the one or more processors 201 can control the display brightness of the display 202 using the merged brightness adjustment model 217. The adaptive brightness modeling component 211 can receive data from the various sensors 208, including the light sensor 209, or the other components. In one or more embodiments, the one or more processors 201 are configured to perform the operations of the adaptive brightness modeling component 211.

In one or more embodiments, the adaptive brightness modeling component 211 is operable to combine, using an isotonic regression model, some display brightness values corresponding to some ambient light values selected from the previously generated brightness adjustment model 213 stored in the memory 207 with at least one user defined display brightness and at least one corresponding ambient light value sensed by the light sensor 209 to obtain a merged brightness adjustment model 217. In one or more embodiments, the merged brightness adjustment model 217 is a non-decreasing, monotonic function for a set of increasing ambient light values. From this merged brightness adjustment model 217, the one or more processors 201 can adjust a brightness level of the display 202 as a function of the sensed ambient light level measured by the light sensor 209 and the merged brightness adjustment model 217.

In one or more embodiments, the adaptive brightness modeling component 211, prior to the one or more processors 201 adjusting the brightness level of the display 202, can filter a merged brightness adjustment model dataset 215 obtained from the display brightness values corresponding to the ambient light value selected from the brightness adjustment model 213 stored in the memory 207 that are combined with the at least one user defined display brightness and the at least one corresponding sensed ambient light value to obtain a filtered merged brightness adjustment model dataset 216. Additionally, the adaptive brightness modeling component 211 can extract the merged brightness adjustment model 217 from the filtered merged brightness adjustment model dataset 216 as well. Illustrating by example, the adaptive brightness modeling component 211 may apply a monotonic cubic spline to the filtered merged brightness adjustment model dataset 216 to extract the merged brightness adjustment model 217 in one or more embodiments. Examples of how this can occur are described below with reference to FIGS. 4 and 12-19.

In one or more embodiments, the merged brightness adjustment model 217 extracted by the adaptive brightness modeling component 211 defines a number of nits per pixel for each ambient light value of the set of increasing ambient light values of the merged brightness adjustment model 217. In one or more embodiments, the adaptive brightness modeling component 211 repeats this process, thereby continuing to generate merged brightness adjustment models for use by the one or more processors 201 to adjust the display brightness of the display 202 continually and “on the fly.” Said differently, in one or more embodiments the adaptive brightness modeling component 211 repeats using the previously generated merged brightness adjustment model 217 as the brightness adjustment model 213 from which some display brightness and corresponding ambient light value pairs 212 are selected to be combined with at least one user defined display brightness and a corresponding ambient light value 214 sensed by the light sensor 209 to obtain a new merged brightness adjustment model. The one or more processors 201 can then adjust the display brightness of the display 202 as a function of a present ambient light value sensed by the light sensor 209 and the new merged brightness adjustment model 217. In one or more embodiments, this recurrence occurs multiple times within a twenty-four-hour period.

In one or more embodiments, the one or more processors 201 may generate commands based upon the output from the adaptive brightness modeling component 211. Illustrating by example, the one or more processors 201 may obtain an ambient light value measured by the light sensor 209 and then may reference the merged brightness adjustment model 217 to control the display brightness of the display 202 by selecting a corresponding display brightness pair for the obtained ambient light value.

It is to be understood that FIG. 2 is provided for illustrative purposes only and for illustrating components of explanatory electronic devices configured in accordance with one or more embodiments of the disclosure and is not intended to be a complete schematic diagram of the various components required for an electronic device. Therefore, other electronic devices in accordance with embodiments of the disclosure may include various other components not shown in FIG. 2 or may include a combination of two or more components or a division of a particular component into two or more separate components, and still be within the scope of the present disclosure.

Figure 3:
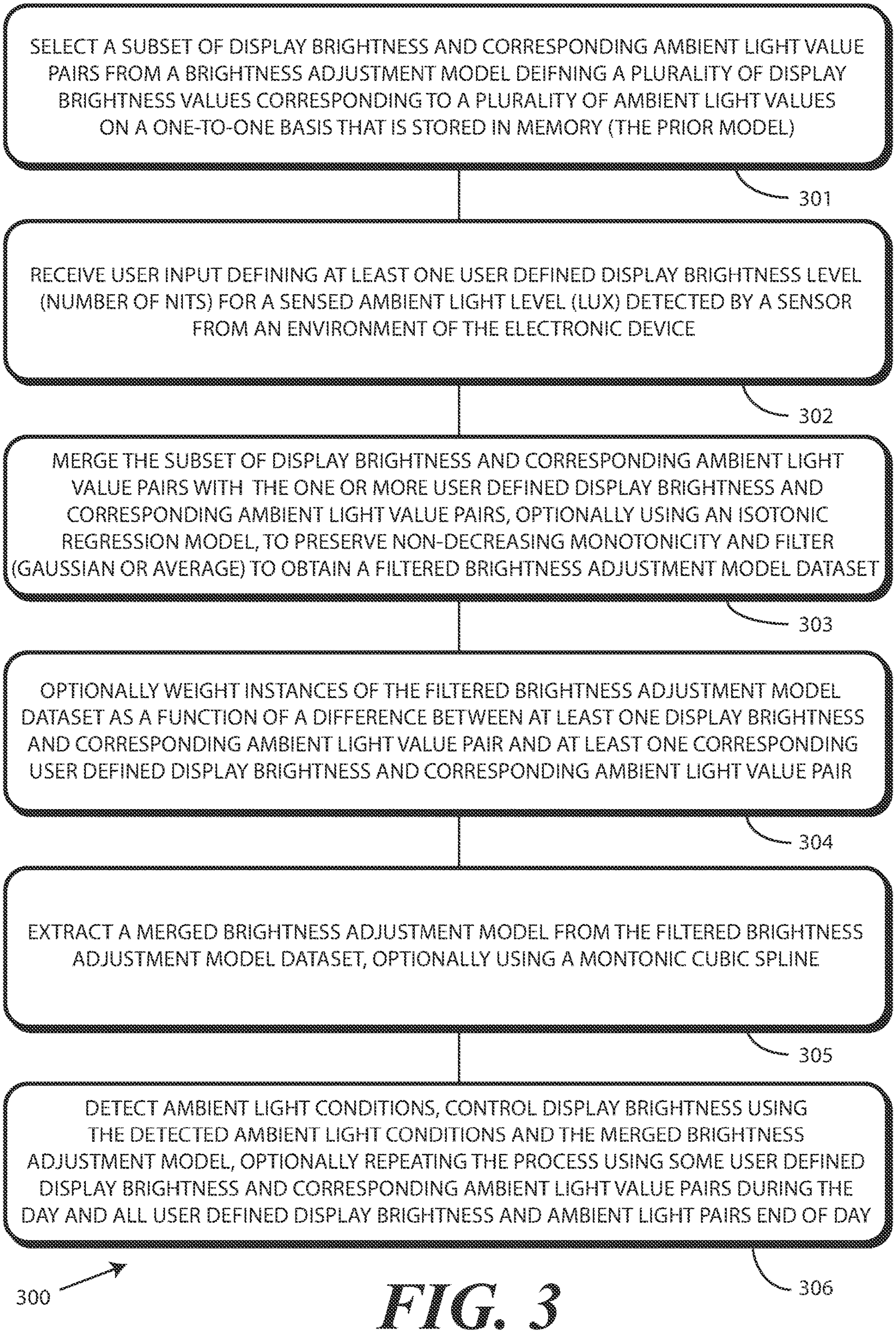
FIG. 3 illustrates one explanatory method in accordance with one or more embodiments of the disclosure.

Turning now to FIG. 3, illustrated therein is one explanatory method 300 in accordance with one or more embodiments of the disclosure. Beginning at step 301, the method 300 selects a subset of display brightness and ambient light value pairs from a brightness adjustment model stored in a memory of an electronic device. In one or more embodiments, the subset of display brightness and ambient light value pairs are selected from a plurality of display brightness and ambient light value pairs contained in the brightness adjustment model. In one or more embodiments, the display brightness and corresponding ambient light value pairs correspond to each other on a one-to-one basis and define a non-decreasing, monotonic function for a set of increasing ambient light values. Illustrating by example, in one or more embodiments the display brightness and corresponding ambient light value pairs each comprise a level of display brightness, measured in nits, for a sensed ambient light value, measured in lux.

In one or more embodiments, the brightness adjustment model constitutes a previously generated merged brightness adjustment model created by the method 300 shown in FIG.

3. In one or more embodiments, the method 300 is triggered when a user interacts with a user interface of an electronic device to define, adjust, or redefine preferred display brightness levels for a particular ambient light level. Accordingly, when the method 300 repeats, the previously generated merged brightness adjustment model extracted at step 305 becomes the brightness adjustment model from which the display brightness and corresponding ambient light value pairs are selected at step 301. In one or more embodiments, the method 300 repeats at least four times within a twenty-four-hour period.

At step 302, the method 300 receives user input defining at least one user defined display brightness and corresponding ambient light value pair preferred by a user. In one or more embodiments, the at least one user defined display brightness and corresponding ambient light value pair defines a preferred display brightness setting identified by the user for a given ambient light level. If, for example, the brightness adjustment model stored in memory from which the display brightness and corresponding ambient light value pairs were selected at step 301 had the display too bright in at a bright ambient light level, the user may enter at least one user defined display brightness and corresponding ambient light value pair to reduce the display brightness. By contrast, if the brightness adjustment model from which the display brightness and corresponding ambient light value pairs were selected at step 301 had the display brightness too dim in at a low ambient light level, the at least one user defined display brightness and corresponding ambient light value pair may cause the display brightness to increase, and so forth.

In one or more embodiments, the user merely enters the at least one user defined display brightness, while a light sensor of the electronic device measures the corresponding ambient light value pair. Accordingly, in one or more embodiments step 302 comprises a user interface of an electronic device receiving one or more user defined display brightness and ambient light value pairs. They are received from user input occurring at a user interface of the electronic device, as the user must adjust the display brightness to a desired value.

At step 303, the display brightness and corresponding ambient light value pairs selected from the brightness adjustment model at step 301 and the user defined display brightness and corresponding ambient light value pairs received at step 302 are merged to obtain a merged brightness adjustment model dataset. In one or more embodiments, the merged brightness adjustment model dataset defines a non-decreasing, monotonic function of display brightness levels for a set of increasing ambient light values. In one or more embodiments, the merged brightness adjustment model dataset is piecewise linear after the display brightness and corresponding ambient light value pairs selected from the brightness adjustment model at step 301 and the user defined display brightness and corresponding ambient light value pairs received at step 302 are merged.

In one or more embodiments, the merging occurring at step 303 comprises applying an isotonic regression to a combination of the display brightness and corresponding ambient light value pairs selected from the brightness adjustment model at step 301 and the user defined display brightness and corresponding ambient light value pairs received at step 302. Said differently, in one or more embodiments step 303 comprises combining a subset of display brightness and ambient light value pairs and the one or more user defined display brightness and ambient light value pairs using an isotonic regression model to obtain a combined brightness adjustment model dataset defining a non-decreasing, monotonic function. Accordingly, in one or more embodiments the merging occurring at step 303 preserves a non-decreasing monotonicity for the combined brightness adjustment model dataset.

In addition to merging, in one or more embodiments step 303 comprises the method 300 filtering the merged brightness adjustment model dataset to obtain a filtered merged brightness adjustment model dataset. In one or more embodiments, the filtered merged brightness adjustment model dataset defines a continuous function. Illustrating by example, in one or more embodiments the merged brightness adjustment model dataset is piecewise linear since it is created by applying an isotonic regression model to the display brightness and corresponding ambient light value pairs selected from the brightness adjustment model at step 301 and the user defined display brightness and corresponding ambient light value pairs received at step 302. To remove these "steps" from the merged brightness adjustment model dataset, in one or more embodiments step 303 comprises filtering the merged brightness adjustment model dataset to obtain that filtered merged brightness adjustment model dataset that is a continuous function devoid of any steps that may be artifacts from the isotonic regression model. This filtering performed at step 303 can occur in a variety of ways.

In one or more embodiments, the filtering comprises applying a Gaussian filter to the merged brightness adjustment model dataset to obtain the filtered merged brightness adjustment model dataset. Illustrating by example, in one or more embodiments the filtering comprises applying a one-dimensional Gaussian convolution model to the merged brightness adjustment model dataset to obtain the filtered merged brightness adjustment model dataset.

While the application of a one-dimensional Gaussian convolution model works well in practice, experimental testing has demonstrated that in low light the one-dimensional Gaussian convolution model can result in display brightness levels being too high for very low ambient light levels. An example of this will be shown and described below with reference to FIG. 19. Thus, in high ambient light levels, the one-dimensional Gaussian convolution model allows the resulting merged brightness adjustment model to preform properly. However, at low display brightness and corresponding ambient light value pairs, the reduction of the display brightness to zero lux is almost non-responsive when the Gaussian filter is used. A display brightness may be, for example, fifty nits when it should be only three.

To correct for this, in another embodiment the filtering occurring at step 303 comprises applying an average of even instances of the merged brightness adjustment model dataset and odd instances of the merged brightness adjustment model dataset to obtain the filtered merged brightness adjustment model dataset. This method of filtering provides markedly improved performance for low display brightness and corresponding ambient light value pairs. Thus, in one or more embodiments step 303 comprises applying an average of even instances of the subset of display brightness and ambient light value pairs and odd instances of the subset of display brightness and ambient light value pairs to the combined brightness adjustment model dataset to obtain a continuous function that is non-decreasing for an increasing set of ambient light value pairs.

At optional step 304, weighting can be applied to the filtered merged brightness adjustment model dataset. Embodiments of the disclosure contemplate that the "new" merged brightness adjustment model extracted at step 305 should not be strikingly different from the brightness adjustment model used at step 301 in response to a user defined display brightness and corresponding ambient light value pair. This is true because a user is likely to prefer subtle changes in display brightness over those taking a super bright display and making it super dark instantly. Accordingly, when optional step 304 is included, the weighting applied ensures that the merged brightness adjustment model extracted at step 305 is not far from the brightness adjustment model used at step 301.

In one or more embodiments, optional step 304 comprises weighting instances of the filtered merged brightness adjustment model dataset as a function of a difference between at least one display brightness and corresponding ambient light value pair and at least one corresponding user defined display brightness and corresponding ambient light value pair. In one or more embodiments, optional step 304, which occurs prior to the extracting occurring at step 305, comprises weighting instances of the filtered merged brightness adjustment model dataset as a function of an inverse of the difference between the at least one display brightness and corresponding ambient light value pair and the corresponding user defined display brightness and its corresponding ambient light value pair. Thus, if the difference between the display brightness values of the brightness adjustment model used at step 301 and the user defined brightness level received at step 302 for a given ambient light level is large, the weighting factors applied at optional step 304 will be reduced. By contrast, if the difference between the display brightness values of the brightness adjustment model used at step 301 and the user defined brightness level received at step 302 for a given ambient light level is small, the weighting factors applied at optional step 304 will be increased, and so forth.

At step 305, the method 300 extracts a merged brightness adjustment model from the filtered merged brightness adjustment model dataset. In one or more embodiments, this step 305 comprises applying a monotonic cubic spline to the filtered merged brightness adjustment model dataset to obtain the merged brightness adjustment model.

At step 306, the method 300 controls an output brightness of a display of an electronic device as a function of the merged brightness adjustment model. In one or more embodiments, this comprises detecting, using a light sensor or other sensor of an electronic device, an ambient light level of an environment of the electronic device. Thereafter, the display brightness of the electronic device is controlled using the merged brightness adjustment model by adjusting the display brightness to a level defined by the merged brightness adjustment model and the ambient light level of the environment of the electronic device.

In one or more embodiments, the method 300 can then repeat. The merged brightness adjustment model extracted at step 305 becomes the brightness adjustment model from which the display brightness and corresponding ambient light value pairs are selected at step 301. One example of how this can occur will be illustrated and described below with reference to FIG. 11.

Figure 4:
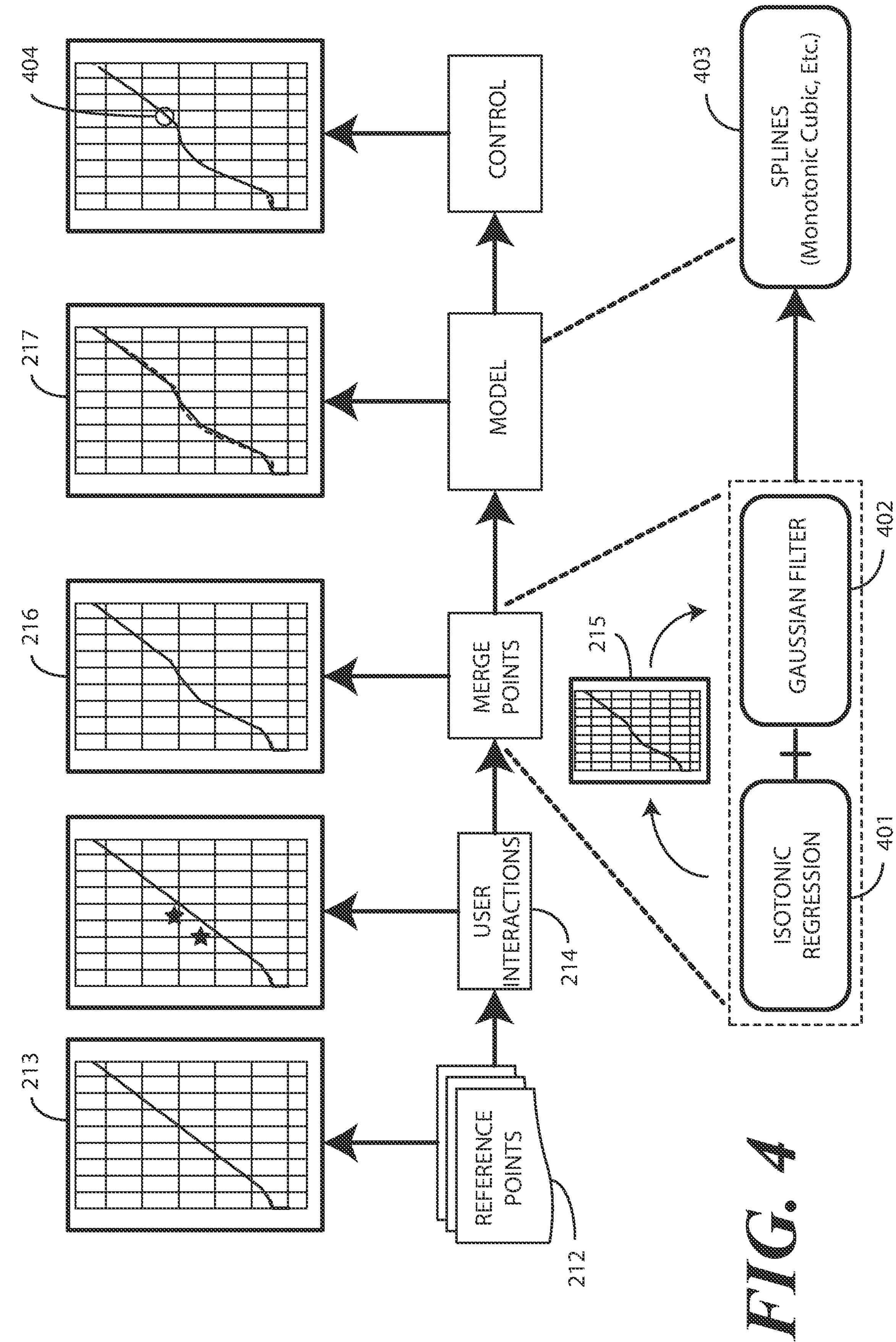
FIG. 4 illustrates one explanatory signal flow diagram for an electronic device in accordance with one or more embodiments of the disclosure.

Turning now to FIG. 4, illustrated therein is a signal flow diagram illustrating the method (300) of FIG. 3 in operation. Initially, one or more processors of an electronic device select a plurality of display brightness and corresponding ambient light value pairs 212 from a brightness adjustment model 213 stored in a memory of the electronic device. One or more user defined display brightness and corresponding ambient light value pairs 214 are then received from a user input and a light sensor of the electronic device. In one or more embodiments, the light sensor measures the ambient light level while the user delivers the user defined display brightness for that ambient light level to the user interface of the electronic device. In other embodiments, the user input can define both the user defined display brightness and corresponding ambient light value pairs 214.

One or more processors of the electronic device then merge, or combine, the display brightness and corresponding ambient light value pairs 212 with the user defined display brightness and corresponding ambient light value pairs 214 to obtain one or both of a merged brightness adjustment model dataset 215 and/or a filtered merged brightness adjustment model dataset 216. When the signal flow diagram is running "on the fly," the filtering is omitted and only the merging occurs. However, when the signal flow diagram is in a learning mode, the merging and filtering both occur. Instances of each will be illustrated and described below with reference to FIG. 11.

In one or more embodiments, the merging comprises applying an isotonic regression model 401 to a combination of the display brightness and corresponding ambient light value pairs 212 and the user defined display brightness and corresponding ambient light value pairs 214 to preserve a non-decreasing, monotonic function that is the merged brightness adjustment model dataset 215.

Figure 12:
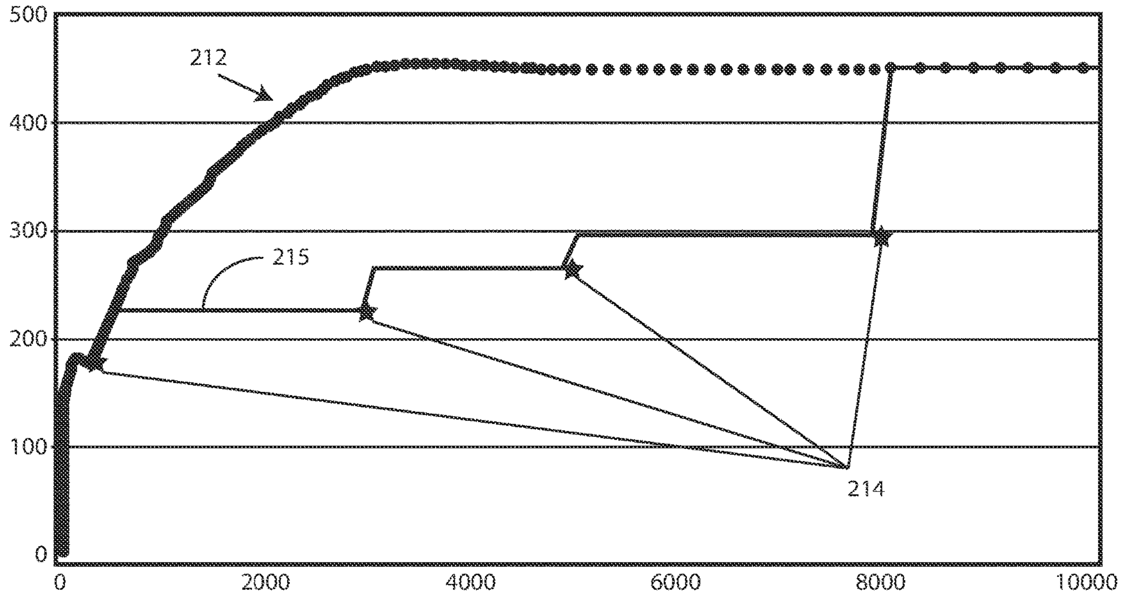
FIG. 12 illustrates one explanatory merged brightness adjustment model dataset in accordance with one or more embodiments of the disclosure.

An example of the merged brightness adjustment model dataset 215 is shown in FIG. 12. Turning briefly to FIG. 12, illustrated therein are the display brightness and corresponding ambient light value pairs 212 and the user defined display brightness and corresponding ambient light value pairs 214. When an isotonic regression model (401) is applied, the result is a merged brightness adjustment model dataset 215. As shown, in one or more embodiments this merged brightness adjustment model dataset 215 is piecewise linear.

Figure 13:
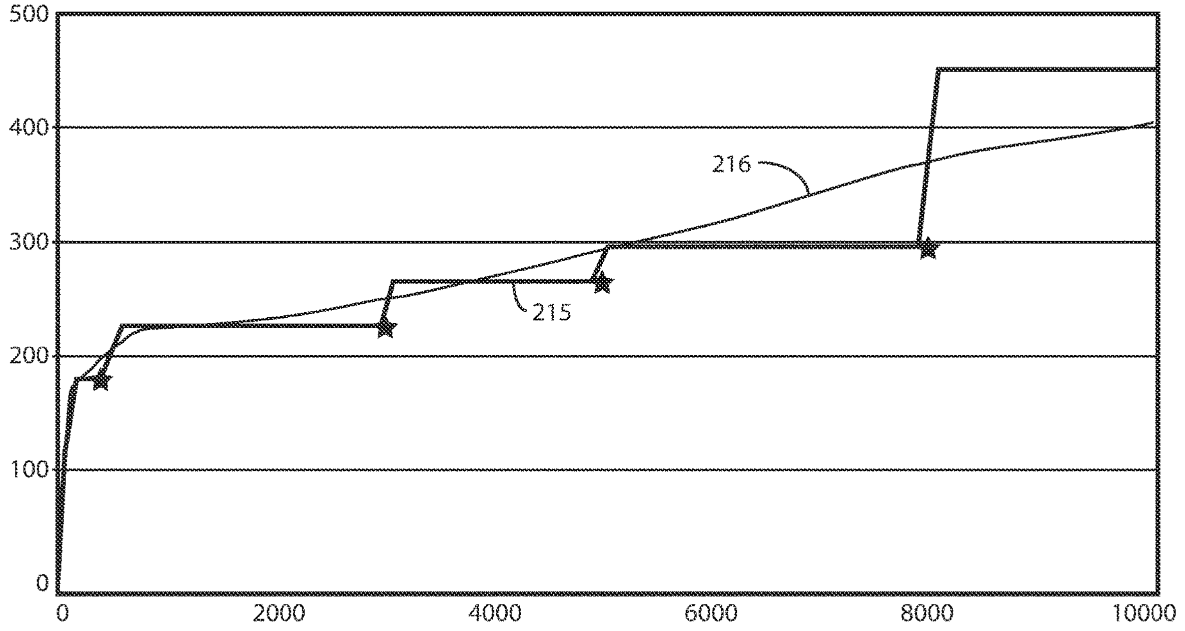
FIG. 13 illustrates one explanatory filtered brightness adjustment model dataset in accordance with one or more embodiments of the disclosure.

Turning now back to FIG. 4, since this merged brightness adjustment model dataset 215 can be piecewise linear, a filtering step can be applied. In one or more embodiments, the filtering comprises applying a one-dimensional Gaussian convolution model 402 to the merged brightness adjustment model dataset 215 to obtain the filtered merged brightness adjustment model dataset 216. Turning briefly to FIG. 13, one example of a filtered merged brightness adjustment model dataset 216 when a one-dimensional Gaussian convolution model 402 is applied to the merged brightness adjustment model dataset 215 is shown.

Figure 14:
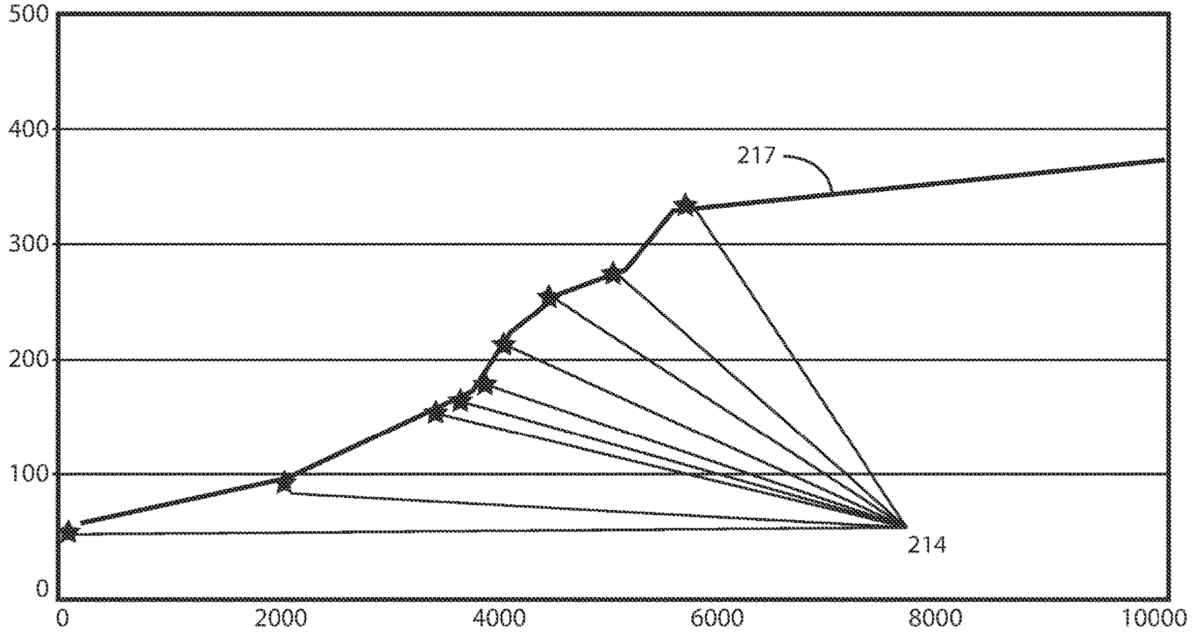
FIG. 14 illustrates one explanatory merged brightness adjustment model in accordance with one or more embodiments of the disclosure.

Turning now back to FIG. 4, the merged brightness adjustment model 217 is extracted from the filtered merged brightness adjustment model dataset 216. In one or more embodiments, this comprises applying a monotonic cubic spline 403 to the filtered merged brightness adjustment model dataset to obtain the merged brightness adjustment model 217. Turning briefly to FIG. 14, illustrated therein is one explanatory merged brightness adjustment model 217 after the monotonic cubic spline (403) is applied. As shown, it fits the user defined display brightness and corresponding ambient light value pairs 214 perfectly.

Turning now back to FIG. 4, one or more processors of the electronic device can then control the display brightness 404 as a function of the ambient light level detected by a light sensor and the merged brightness adjustment model 217 by referencing a particular display brightness 404 for the sensed ambient light level and causing the display to output a luminous flux for that display brightness 404.

Figure 5:
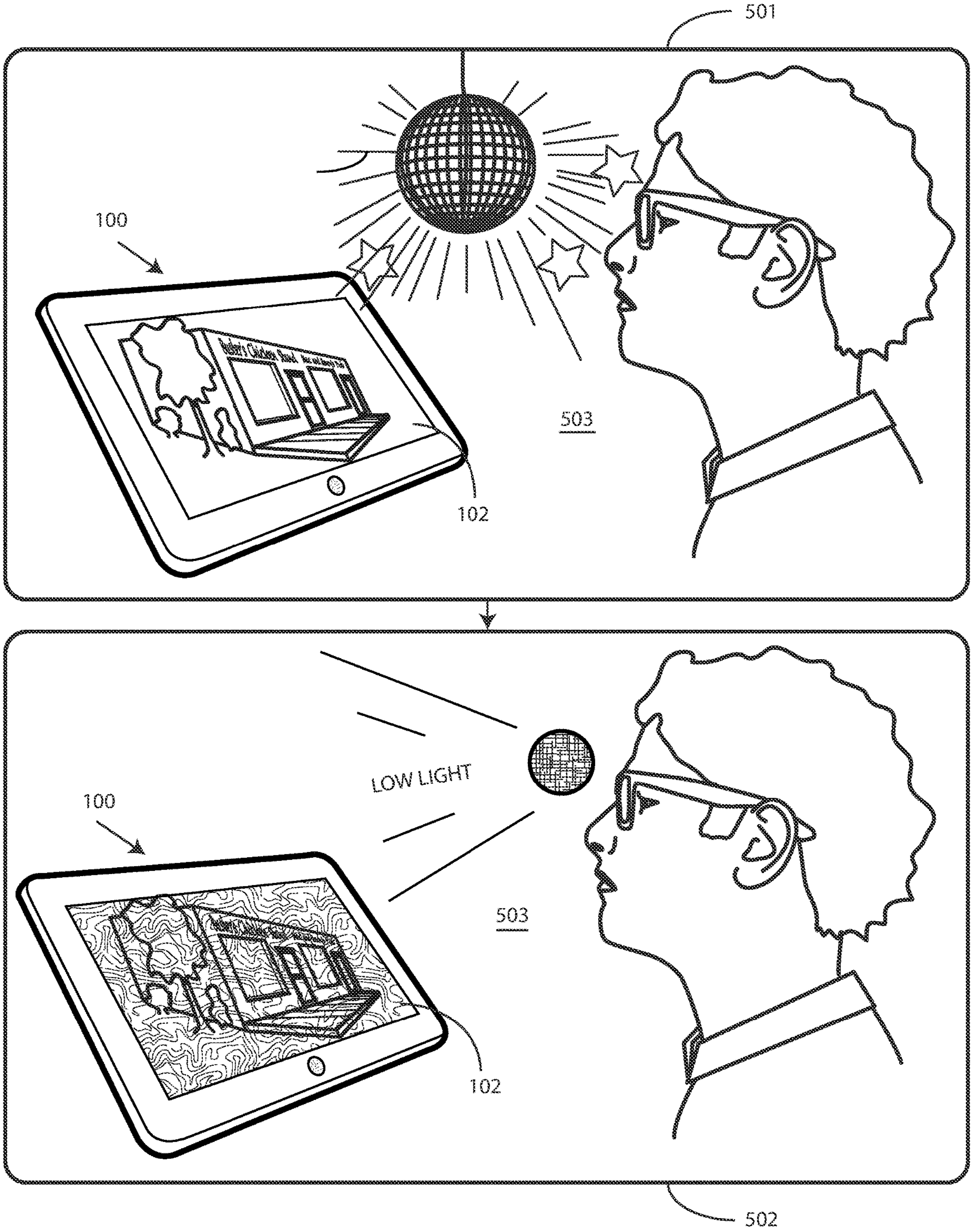
FIG. 5 illustrates one or more method steps in accordance with one or more embodiments of the disclosure.

As shown in FIG. 5, this automatically causes the display brightness to adjust in response to changing ambient light levels. At step 501, the ambient light level 503, as sensed by the light sensor, is at a high lux level. Accordingly, the one or more processors (201) of the electronic device 100 reference the merged brightness adjustment model (217) to determine the necessary display brightness (404) and cause the display 102 to emit more nits, thereby resulting in a greater display brightness. By contrast, at step 502, the ambient light level 503 is at a low lux level. Accordingly, the one or more processors (201) of the electronic device 100 again reference the merged brightness adjustment model (217) to select the corresponding display brightness (404) and cause the display 102 to reduce the number of nits emitted, thereby dimming the display brightness.

As shown, the isotonic regression model (401), working in tandem with a filter, one example of which is the one-dimensional Gaussian convolution model (402) generate a new dataset, the merged brightness adjustment model dataset (215), from a previous brightness adjustment model (213) and user interaction data represented by the user defined display brightness and corresponding ambient light value pairs (214). Then, an interpolation, one example of which is the application of a monotonic cubic spline (403), can be fitted to the filtered merged brightness adjustment model dataset (216). Finally, the resulting merged brightness adjustment model (217) can be used to automatically predict the proper display brightness for a given ambient light level.

Said differently, for a given baseline set of reference points set forth in a brightness adjustment model, the method (300) of FIG. 3 and the signal flow diagram of FIG. 4 merge some of the previous display brightness and corresponding ambient light value pairs with some user defined display brightness and corresponding ambient light value pairs to create a union of the sets. The resulting merged brightness adjustment model dataset (215) is optionally filtered and sampled, providing the new merged brightness adjustment model (217). Advantageously, the method (300) and signal flow diagram combine models, algorithms, and processes that preserve non-decreasing monotonicity and smooth (when filtering is applied) properties. All that is required to adjust display brightness is a measured ambient light level. Any time a user adjusts a preferred brightness, the method (300) and signal flow diagram can repeat the process for faster convergence to user defined preferences than in prior art display brightness adjustment systems.

Figure 6:
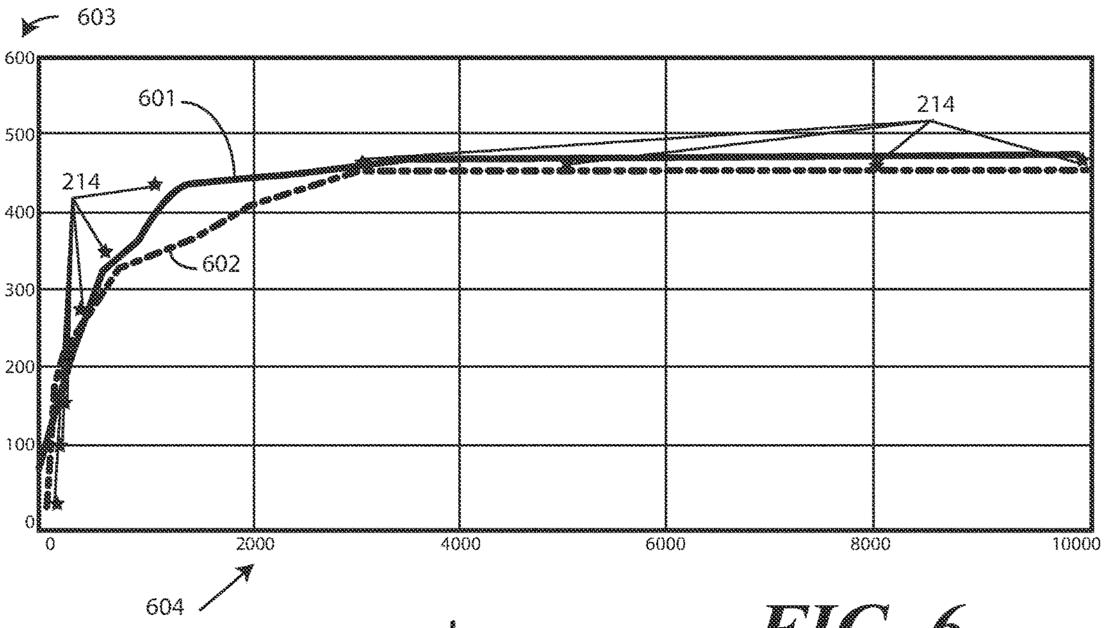
FIG. 6 illustrates one explanatory display illumination curve in accordance with one or more embodiments of the disclosure.

To illustrate this, turn now to FIG. 6. Illustrated therein is a brightness adjustment model 602 configured in accordance with embodiments of the disclosure. Also shown is a prior art display brightness adjustment curve 601. Reference will be made to this prior art display brightness adjustment curve 601 to illustrate additional advantages of embodiments of the disclosure in FIGS. 9 and 10. Each defines a display brightness level 603 for a set of increasing ambient light values 604. Each is operable to adjust the display brightness of a display of an electronic device. The brightness adjustment model 602 has been generated from all the user defined display brightness and corresponding ambient light value pairs 214 received during the previous day.

Figure 7:
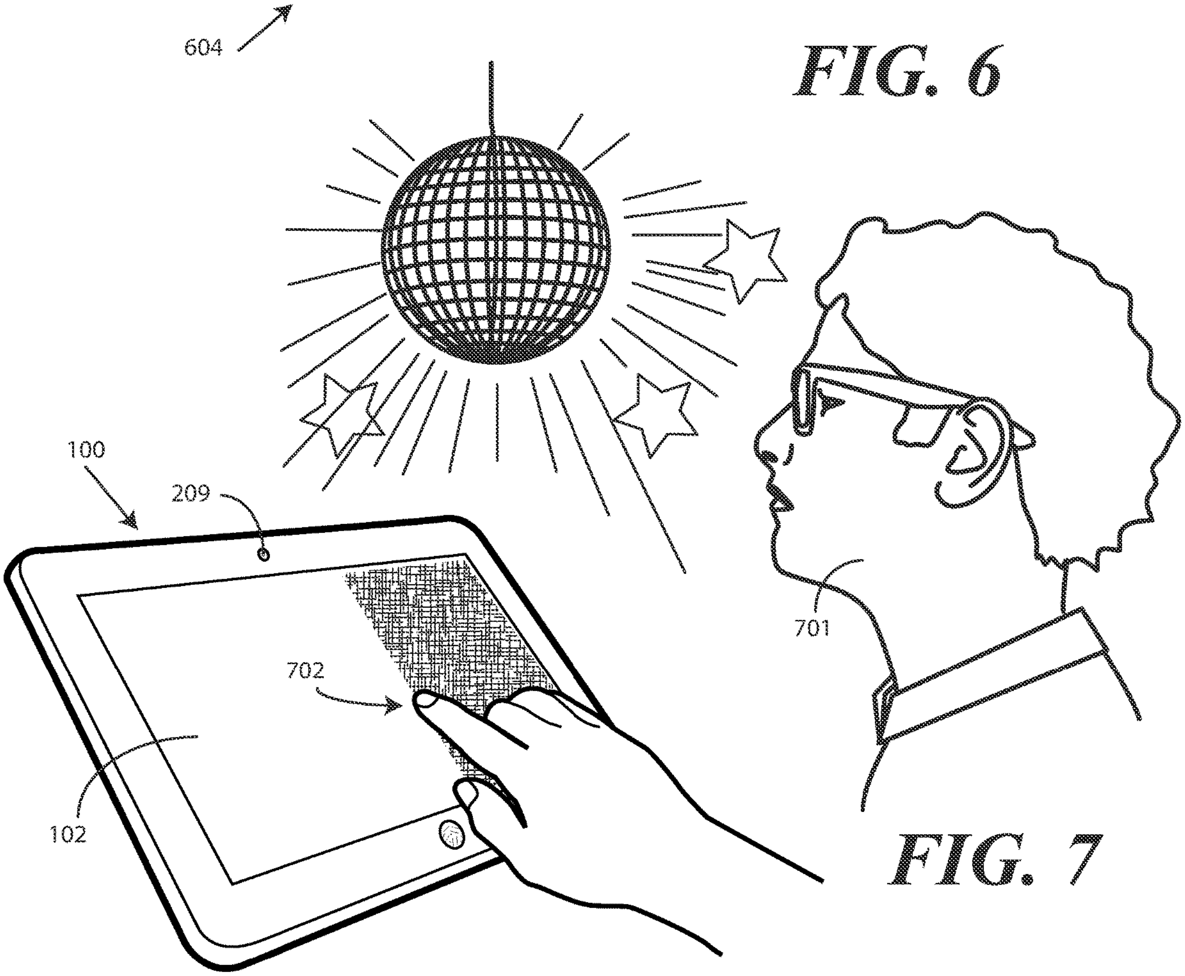
FIG. 7 illustrates one or more method steps in accordance with one or more embodiments of the disclosure.

To initially show how user input is used to adjust the brightness adjustment model 602, turn now to FIG. 7. As shown in this figure, a user 701 of an electronic device 100 is not perfectly happy with the display brightness levels that are being set by the brightness adjustment model (602). Accordingly, the user 701 delivers user input 702 to a user interface (here display 102) of the electronic device 100 while a light sensor 209 measures the ambient light level of the environment of the electronic device 100. This user input 702 and measured ambient light level thus define at least one user defined display brightness and corresponding ambient light value pair that is different from the display brightness being set by the brightness adjustment model 602. In this illustrative example, the user input 702 requests that the display 102 be dimmer for all light levels.

Figure 8:
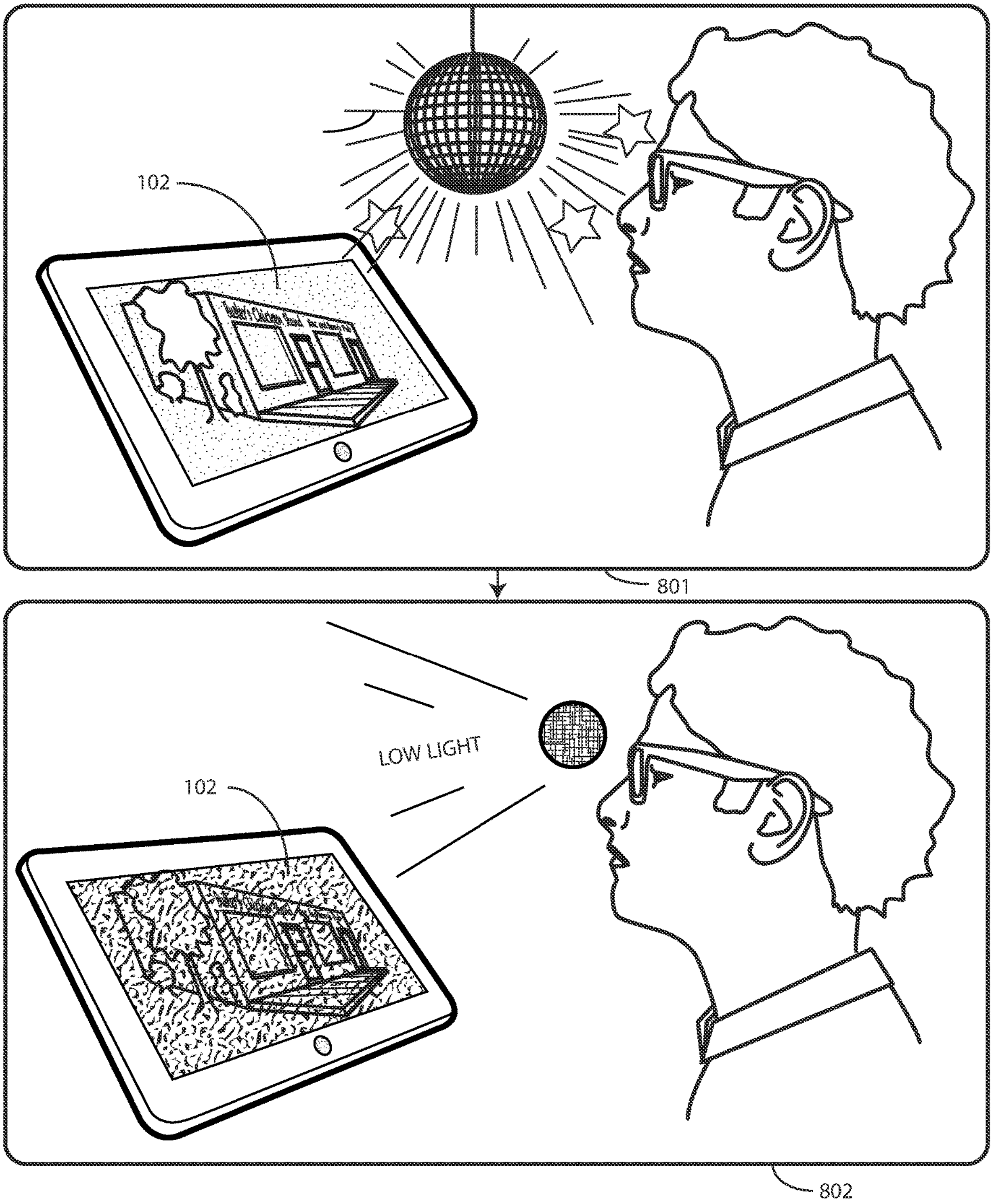
FIG. 8 illustrates one or more method steps in accordance with one or more embodiments of the disclosure.

Turning now to FIG. 8, and comparing FIG. 8 with FIG. 6, the user input (702) of FIG. 7 has been input into the signal flow diagram of FIG. 4. Almost instantly, as shown at step 801, the display 102 is dimmer in the full light condition that it was at step (501) of FIG. 5. Similarly, the display 102 is also dimmer in the low light condition shown at step 802 than it was at step (502) of FIG. 5.

Figure 9:
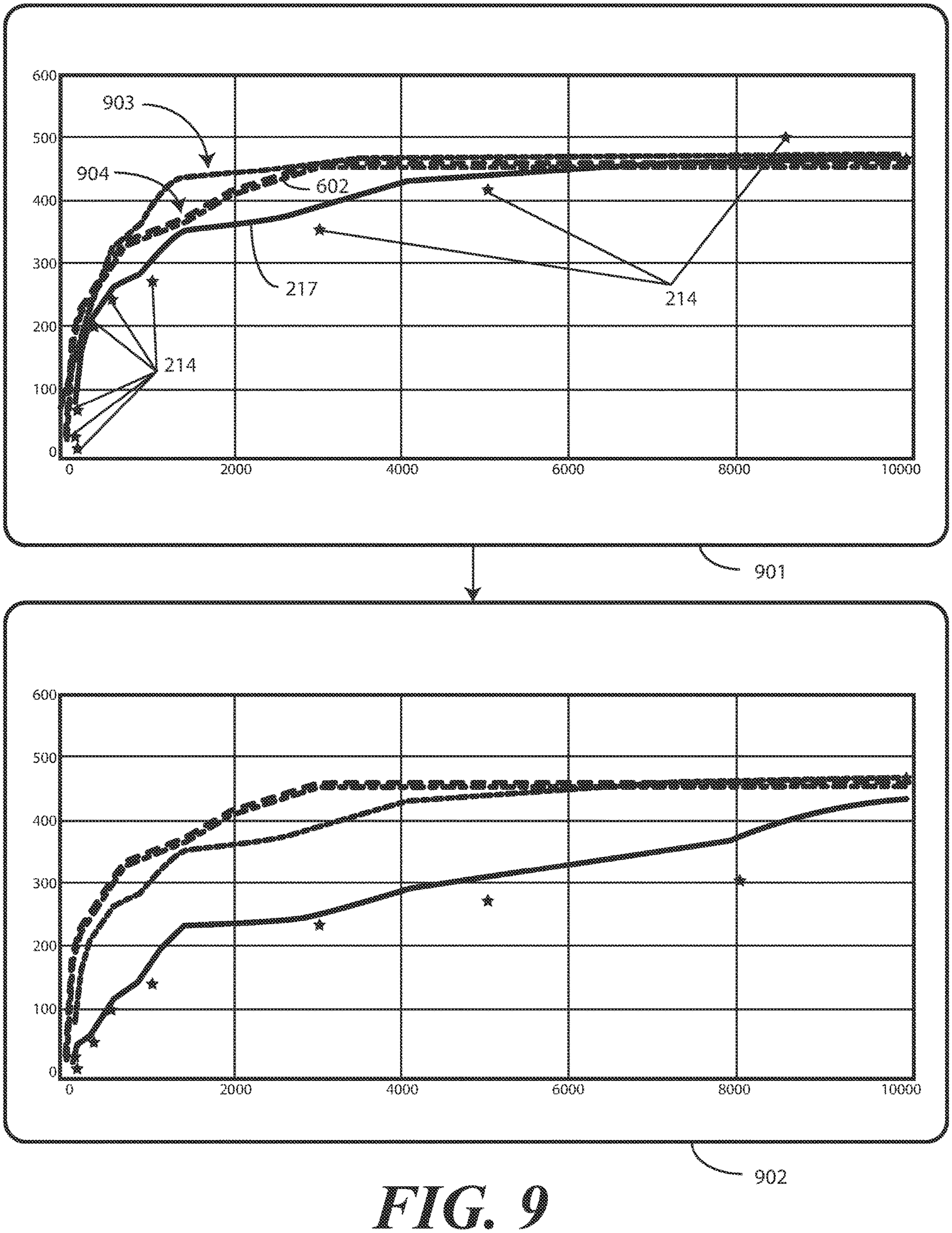
FIG. 9 illustrates, via explanatory display illumination curves, one or more method steps in accordance with one or more embodiments of the disclosure.
Figure 10:
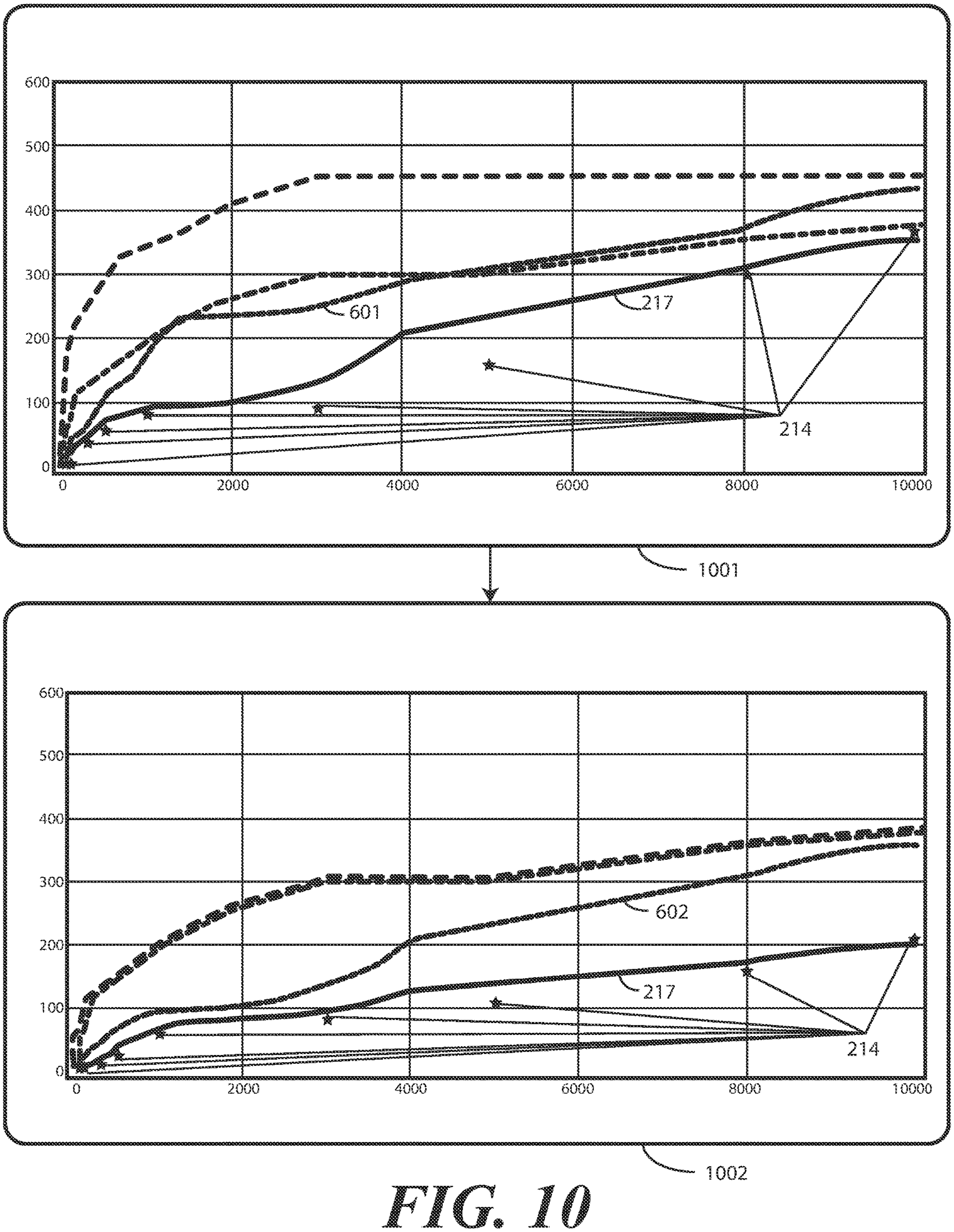
FIG. 10 illustrates, via explanatory display illumination curves, one or more method steps in accordance with one or more embodiments of the disclosure.

That this "almost instant" response is faster than the prior art display brightness adjustment curve (601) of FIG. 6 is shown by the testing data of FIGS. 9 and 10. Beginning at step 901, the user defined display brightness and corresponding ambient light value pairs 214 have been received from the user input (702) of FIG. 7 when the prior art display brightness adjustment curve 601 and the brightness adjustment model 217 were in their original positions 903,904, respectively. The prior art display brightness adjustment curve 601 has begun to adjust, as has the merged brightness adjustment model 217 being extracted from the signal flow diagram of FIG. 4. As shown in this diagram, the merged brightness adjustment model 217 is much closer to the user defined display brightness and corresponding ambient light value pairs 214 than is the prior art display brightness adjustment curve 601.

As shown at step 902, when additional user defined display brightness and corresponding ambient light value pairs 214 is received, the merged brightness adjustment model 217 of embodiments of the disclosures much more accurately tracks the user defined display brightness and corresponding ambient light value pairs 214 than does the prior art display brightness adjustment curve 601. As shown in FIG. 10, this improved performance continues at steps 1001,1002 for subsequent user defined display brightness and corresponding ambient light value pairs 214 as well. In sum, the merged brightness adjustment model 217 of embodiments of the disclosure is simply more responsive to the user defined display brightness and corresponding ambient light value pairs 214 than is the prior art display brightness adjustment curve 601.

Figure 11:
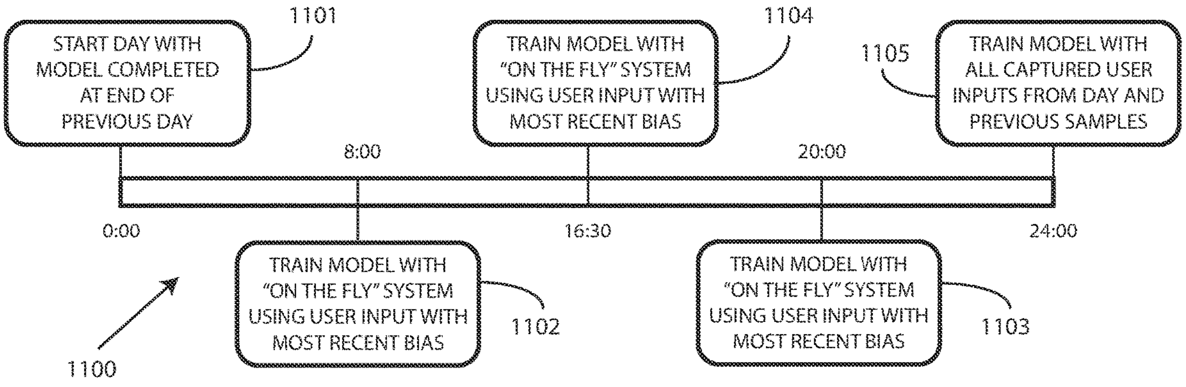
FIG. 11 illustrates one explanatory temporal method in accordance with one or more embodiments of the disclosure.

Turning now to FIG. 11, illustrated therein is one explanatory operational diagram 1100 in accordance with one or more embodiments of the disclosure. As noted above with reference to FIGS. 3 and 4, in one or more embodiments the method (300) of FIG. 3 or the signal flow diagram of FIG. 4 can repeat to offer continual refinement of the merged brightness adjustment model, one example of which was shown in FIGS. 9-10. Additionally, the method (300) of FIG. 3 or the signal flow diagram of FIG. 4 can be applied "on the fly," where no filtering occurs, or in a training mode, where filtering occurs. This is illustrated in the operational diagram 1100 of FIG. 11.

The operational diagram 1100 shows a typical day where the method (300) of FIG. 3 or the signal flow diagram of FIG. 4 runs at least four times in a twenty-four-hour period. At stage 1101, which is at the beginning of the twenty-four-hour period, the method (300) of FIG. 3 or the signal flow diagram of FIG. 4 operate in a training mode. Similarly, at the end of the day, at stage the method (300) of FIG. 3 or the signal flow diagram of FIG. 4 also operates in a training mode. In each of these training modes, the merged brightness adjustment model dataset is filtered to obtain the filtered merged brightness adjustment model dataset from which the merged brightness adjustment model is extracted.

By contrast, at stages 1102,1103,1104, the method (300) of FIG. 3 or the signal flow diagram of FIG. 4 is applied "on the fly." This means that the filtering is not applied and that the merged brightness adjustment model is simply extracted from the merged brightness adjustment model dataset. This allows for a faster generation of the merged brightness adjustment model when the user is operating the electronic device than when the electronic device is charging or in a low power or sleep mode.

Another interesting feature shown in FIG. 11 concerns the amount of user defined display brightness and corresponding ambient light value pairs that are considered between stages. Illustrating by example, at stage 1102, only the user defined display brightness and corresponding ambient light value pairs received since stage 1101 are considered when generating the new merged brightness adjustment model. The same is true with all the "on the fly stages." Illustrating by example, at stage 1103 only the user defined display brightness and corresponding ambient light value pairs received since stage 1102 are considered, and stage 1104 only the user defined display brightness and corresponding ambient light value pairs received since stage 1103 are considered.

By contrast, at stage 1105, which is a training mode, all user defined display brightness and corresponding ambient light value pairs received during the twenty-four-hour period are considered when generating the new merged brightness adjustment model. Thus, as shown in FIG. 11, when the method repeats the at least one user defined display brightness and corresponding ambient light value pairs employed during the final repeat occurring at stage 1105 combines display brightness and corresponding ambient light value pairs selected from the previous brightness adjustment model with all user defined display brightness and corresponding ambient light value pairs received during the twenty-four hour period to obtain the merged brightness adjustment model. By contrast, all other repeats, i.e., stages 1102,1103,1104, combine combines display brightness and corresponding ambient light value pairs selected from the previous brightness adjustment model with fewer than all user defined display brightness and corresponding ambient light value pairs received during the twenty-four-hour period to obtain the merged brightness adjustment model.

As noted above with reference to FIG. 3, while the application of a one-dimensional Gaussian convolution model during the training mode works well in practice, experimental testing has demonstrated that in low light environments the one-dimensional Gaussian convolution model can result in display brightness levels being too high for very low ambient light levels. Thus, at low display brightness and corresponding ambient light value pairs, the reduction of the display brightness to zero lux is almost non-responsive when the Gaussian filter is used. A display brightness may be, for example, fifty nits when it should be only three.

Figure 15:
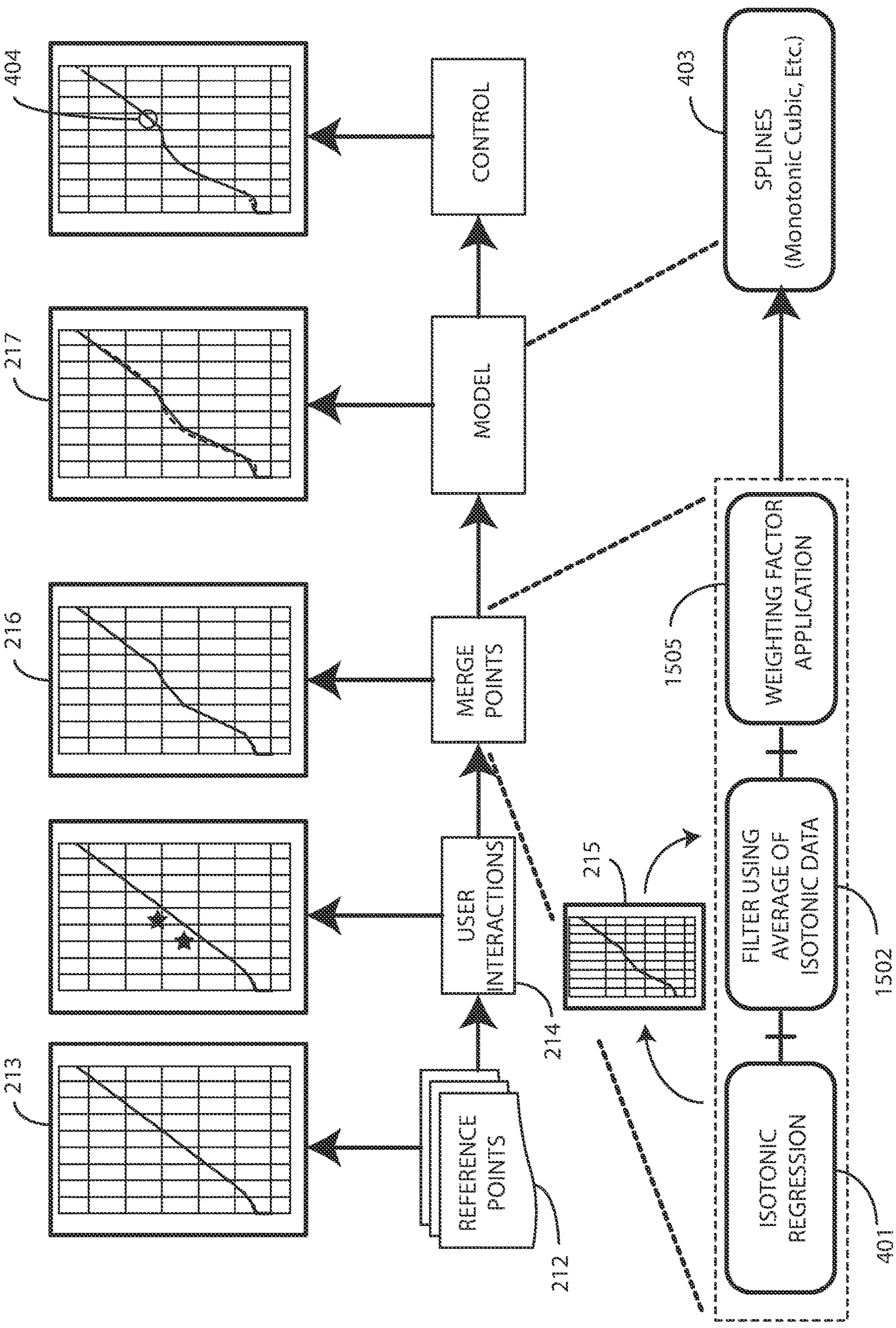
FIG. 15 illustrates another explanatory signal flow diagram for an electronic device in accordance with one or more embodiments of the disclosure.

To correct for this, in another embodiment an alternate filtering occurs. Additionally, weighting can be used to prevent large, dramatic changes occurring in the merged brightness adjustment model in response to user input. Turning now to FIG. 15, illustrated therein is another signal flow diagram depicting this alternate embodiment.

As with the signal flow diagram of FIG. 4, initially one or more processors of an electronic device select a plurality of display brightness and corresponding ambient light value pairs 212 from a brightness adjustment model 213 stored in a memory of the electronic device. One or more user defined display brightness and corresponding ambient light value pairs 214 are then received from a user input and a light sensor of the electronic device.

One or more processors of the electronic device then merge, or combine, the display brightness and corresponding ambient light value pairs 212 with the user defined display brightness and corresponding ambient light value pairs 214 to obtain one or both of a merged brightness adjustment model dataset 215 and/or a filtered merged brightness adjustment model dataset 216. When the signal flow diagram is running "on the fly," the filtering is omitted and only the merging occurs. However, when the signal flow diagram is in a learning mode, the merging and filtering both occur.

As before, in one or more embodiments the merging comprises applying an isotonic regression model 401 to a combination of the display brightness and corresponding ambient light value pairs 212 and the user defined display brightness and corresponding ambient light value pairs 214 to preserve a non-decreasing, monotonic function that is the merged brightness adjustment model dataset 215. Since this merged brightness adjustment model dataset 215 can be piecewise linear, a filtering step can be applied. However, in contrast to the signal flow diagram of FIG. 4, in the signal flow diagram of FIG. 15 a Gaussian filter is not used.

Instead, the filtering 1502 uses an average of the isotonic regression data. Illustrating by example, in one or more embodiments the filtering comprises applying an average of even instances of the merged brightness adjustment model dataset 215 and odd instances of the merged brightness adjustment model dataset 215 to obtain the filtered merged brightness adjustment model dataset 216. This method of filtering provides markedly improved performance for low display brightness and corresponding ambient light value pairs. This is shown in FIGS. 18 and 19.

Beginning with FIG. 18, illustrated therein are a merged brightness adjustment model 1801 filtered by a one-dimensional Gaussian convolution model and another merged brightness adjustment model 1802 filtered using even instances and odd instances of the isotonic regression. At first glance, they appear to offer similar performance. Indeed, they do provide similar performance for ambient light levels greater than about one lux.

However, turning now to FIG. 19, below that level the merged brightness adjustment model 1801 filtered by a one-dimensional Gaussian convolution model is much higher than it should be, and is far higher than is the merged brightness adjustment model 1802 filtered using the even instances and odd instances of the isotonic regression. For this reason, the merged brightness adjustment model 1802 filtered using the even instances and odd instances of the isotonic regression offers better performance for ambient light levels under one lux than does the merged brightness adjustment model 1801 filtered by a one-dimensional Gaussian convolution model.

Turning now back to FIG. 15, regardless of whether the filtering is done using the one-dimensional Gaussian convolution model or the even instances and the odd instances of the isotonic regression, weighting 1505 can be applied to the filtered merged brightness adjustment model dataset 216. Since some users prefer the "new" merged brightness adjustment model 217 not be strikingly different from the brightness adjustment model 213 in response to a user defined display brightness and corresponding ambient light value pair 214, the weighting 1505 applied ensures that the merged brightness adjustment model 217 is not largely dissimilar from the brightness adjustment model 213.

In one or more embodiments, the weighting 1505 instances of the filtered merged brightness adjustment model dataset 216 occurs as a function of a difference between at least one display brightness and corresponding ambient light value pair 212 and at least one corresponding user defined display brightness and corresponding ambient light value pair 214. In one or more embodiments, the weighting 1505 instances of the filtered merged brightness adjustment model dataset 216 occurs as a function of an inverse of the difference between the at least one display brightness and corresponding ambient light value pair 212 and the corresponding user defined display brightness and its corresponding ambient light value pair 214.

Thus, if the difference between the display brightness values of the brightness adjustment model 213 and the user defined brightness level for a given ambient light level is large, the weighting factors will be reduced. By contrast, if the difference between the display brightness values of the brightness adjustment model 213 and the user defined brightness level for a given ambient light level is small, the weighting factors will be increased, and so forth. Equations (1600,1700) for weighting 1505 in this manner are shown in FIGS. 16-17.

Regardless of whether weighting is employed, the merged brightness adjustment model 217 is then extracted from the filtered merged brightness adjustment model dataset 216. In one or more embodiments, this comprises applying a monotonic cubic spline 403 to the filtered merged brightness adjustment model dataset to obtain the merged brightness adjustment model 217. It should be noted that other splines, e.g., cubic splines, can be used in place of the monotonic cubic spline 403 in other embodiments. This is true with the signal flow diagram of FIG. 4 above as well.

One or more processors of the electronic device can then control the display brightness 404 as a function of the ambient light level detected by a light sensor and the merged brightness adjustment model 217 by referencing a particular display brightness 404 for the sensed ambient light level and causing the display to output a luminous flux for that display brightness 404.

Figure 20:
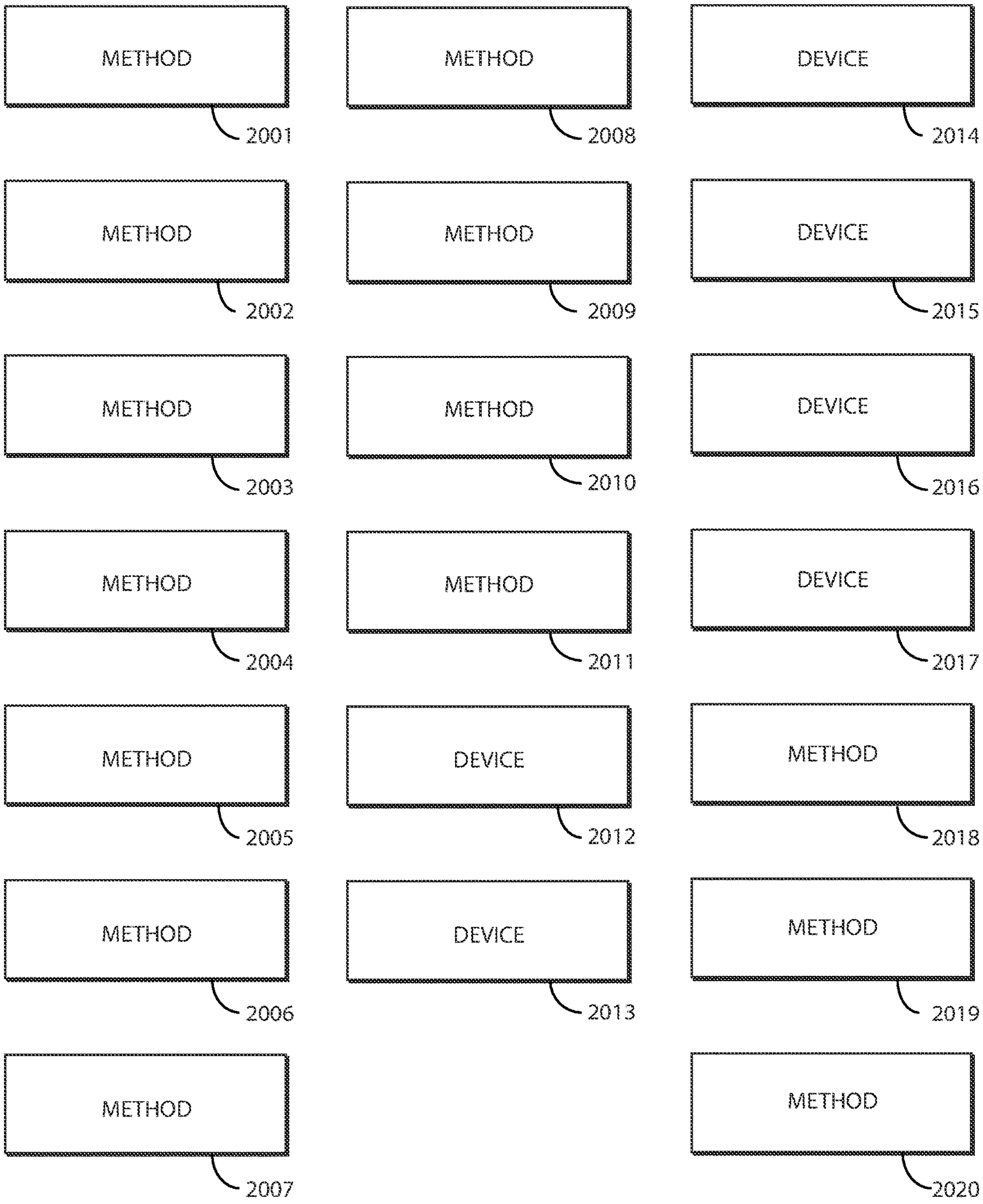
FIG. 20 illustrates various embodiments of the disclosure.

Turning now to FIG. 20, illustrated therein are various embodiments of the disclosure. The embodiments of FIG. 20 are shown as labeled boxes in FIG. 20 due to the fact that the individual components of these embodiments have been illustrated in detail in FIGS. 1-19, which precede FIG. 20. Accordingly, since these items have previously been illustrated and described, their repeated illustration is no longer essential for a proper understanding of these embodiments. Thus, the embodiments are shown as labeled boxes.

At 2001, a method in an electronic device comprises merging, by one or more processors of the electronic device:

- a subset of display brightness and corresponding ambient light value pairs selected from a brightness adjustment model defining a plurality of display brightness values corresponding to a plurality of ambient light values on a one-to-one basis stored in a memory of the electronic device; and
- one or more user defined display brightness and corresponding ambient light value pairs received from user input occurring at a user interface of the electronic device to obtain a merged brightness adjustment model dataset.

At 2001, the method comprises filtering, by the one or more processors, the merged brightness adjustment model dataset to obtain a filtered brightness adjustment model dataset. At 2001, the method comprises extracting, by the one or more processors, a merged brightness adjustment model from the filtered brightness adjustment model dataset. Finally, at 2001, the method comprises controlling, by the one or more processors, a display brightness of a display of the electronic device using the merged brightness adjustment model.

At 2002, the method of 2001 further comprises detecting, by one or more sensors operable with the one or more processors, an ambient light level of an environment of the electronic device. At 2002, the controlling the display brightness of the electronic device using the merged brightness adjustment model adjusts the display brightness to a level defined by the merged brightness adjustment model and the ambient light level of the environment of the electronic device.

At 2003, the merged brightness adjustment model dataset of 2002 defines a non-decreasing, monotonic function for a set of increasing ambient light values. At 2004, the merged brightness adjustment model dataset of 2003 is piecewise linear, and the filtered brightness adjustment model dataset defines a continuous function.

At 2005, the merging of 2004 comprises applying an isotonic regression to a combination of the subset of display brightness and corresponding ambient light value pairs and the one or more user defined display brightness and corresponding ambient light value pairs. At 2006, the filtering of 2005 comprises applying a Gaussian filter to the merged brightness adjustment model dataset to obtain the filtered brightness adjustment model dataset. At 2007, the Gaussian filter comprises a one-dimensional Gaussian convolution model.

At 2008, the filtering of 2005 comprises applying an average of even instances of the merged brightness adjustment model dataset and odd instances of the merged brightness adjustment model dataset to obtain the filtered brightness adjustment model dataset. At 2009, the extracting of 2005 comprises applying a monotonic cubic spline to the filtered brightness adjustment model dataset to obtain the merged brightness adjustment model.

At 2010, the method of 2009 further comprises, prior to the extracting, weighting instances of the filtered brightness adjustment model dataset as a function of a difference between at least one display brightness and corresponding ambient light value pair and at least one corresponding user defined display brightness and corresponding ambient light value pair. At 2011, the weighting of 2010 occurs as an inverse of the difference between the at least one display brightness and corresponding ambient light value pair and the at least one corresponding user defined display brightness and corresponding ambient light value pair.

At 2012, an electronic device comprises a light sensor measuring ambient light levels within an environment of the electronic device. At 2012, the electronic device comprises a memory storing a brightness adjustment model defining a plurality of display brightness values corresponding to a plurality of ambient light values on a one-to-one basis.

At 2012, the electronic device comprises a user interface receiving user input defining at least one user defined display brightness for at least one sensed ambient light value and a display. At 2012, the electronic device comprises one or more processors operable with the display and controlling a display brightness level.

At 2012, the one or more processors combine, using an isotonic regression model, some display brightness values corresponding to some ambient light values selected from the brightness adjustment model with the at least one user defined display brightness and at least one sensed ambient light value to obtain a merged brightness adjustment model.

At 2012, the merged brightness adjustment model is a non-decreasing, monotonic function for a set of increasing ambient light values. At 2012, the one or more processors adjust the display brightness level as a function of a sensed ambient light level measured by the light sensor and the merged brightness adjustment model.

At 2013, the one or more processors of 2012, prior to adjusting the display brightness level as the function of the sensed ambient light level measured by the light sensor and the merged brightness adjustment model, filter a merged brightness adjustment model dataset obtained from the some display brightness values corresponding to the some ambient light values selected from the brightness adjustment model with the at least one user defined display brightness and at least one sensed ambient light value to obtain a filtered brightness adjustment model dataset. At 2013, the one or more processors extract the merged brightness adjustment model from the filtered brightness adjustment model dataset.

At 2014, the one or more processors of 2013 apply a monotonic cubic spline to the filtered brightness adjustment model dataset to extract the merged brightness adjustment model. At 2015, the display of 2014 comprises an organic light emitting diode display. At 2015, the merged brightness adjustment model defines a number of nits per pixel of the organic light emitting diode display for each ambient light value of the set of increasing ambient light values.

At 2016, the one or more processors of 2012 further repeat the combining some display brightness values corresponding to some ambient light values selected from the brightness adjustment model with the at least one user defined display brightness and the at least one sensed ambient light value to obtain the merged brightness adjustment model. At 2016, the one or more processors adjust the display brightness level as the function of the sensed ambient light level measured by the light sensor and the merged brightness adjustment model multiple times within a twenty-four-hour period.

At 2017, the at least one user defined display brightness of 2016 and the at least one sensed ambient light value employed during a final repeat of the combining the some display brightness values corresponding to the some ambient light values selected from the brightness adjustment model with the at least one user defined display brightness and the at least one sensed ambient light value to obtain the merged brightness adjustment model and the adjusting the display brightness level as the function of the sensed ambient light level measured by the light sensor and the merged brightness adjustment model comprises all user defined display brightness and corresponding sensed ambient light values received during the twenty-four hour period. At 2017, all other repeats of the combining the some display brightness values corresponding to the some ambient light values selected from the brightness adjustment model with the at least one user defined display brightness and the at least one sensed ambient light value to obtain the merged brightness adjustment model and the adjusting the display brightness level as the function of the sensed ambient light level measured by the light sensor and the merged brightness adjustment model use fewer than the all user defined display brightness and the corresponding ambient light values received during the twenty-four hour period.

At 2018, a method in an electronic device comprises selecting, by one or more processors of the electronic device, a subset of display brightness and ambient light value pairs from a brightness adjustment model. At 2018, the method comprises receiving, by a user interface of the electronic device, one or more user defined display brightness and ambient light value pairs.

At 2018, the method comprises combining, by the one or more processors, the subset of display brightness and ambient light value pairs and the one or more user defined display brightness and ambient light value pairs using an isotonic regression model to obtain a combined brightness adjustment model dataset defining a non-decreasing, monotonic function. At 2018, the method comprises filtering, by the one or more processors, the combined brightness adjustment model dataset to obtain a filtered brightness adjustment model dataset.

At 2018, the method comprises extracting, by the one or more processors, a merged brightness adjustment model from the filtered brightness adjustment model dataset using a monotonic cubic spline. At 2018, the method comprises controlling, by the one or more processors, an output brightness of a display of the electronic device as a function of the merged brightness adjustment model.

At 2019, the filtering of 2018 comprises applying a one-dimensional Gaussian convolution model to the combined brightness adjustment model dataset. At 2020, the filtering of 2018 comprises applying an average of even instances of the subset of display brightness and ambient light value pairs and odd instances of the subset of display brightness and ambient light value pairs to the combined brightness adjustment model dataset. At 2020, the method further comprises weighting instances of the filtered brightness adjustment model dataset as a function of a difference between at least one display brightness and corresponding ambient light value pair and at least one corresponding user defined display brightness and corresponding ambient light value pair.

In the foregoing specification, specific embodiments of the present disclosure have been described. However, one of ordinary skill in the art appreciates that various modifications and changes can be made without departing from the scope of the present disclosure as set forth in the claims below. Thus, while preferred embodiments of the disclosure have been illustrated and described, it is clear that the disclosure is not so limited. Numerous modifications, changes, variations, substitutions, and equivalents will occur to those skilled in the art without departing from the spirit and scope of the present disclosure as defined by the following claims.

Accordingly, the specification and figures are to be regarded in an illustrative rather than a restrictive sense, and all such modifications are intended to be included within the scope of present disclosure. The benefits, advantages, solutions to problems, and any element(s) that may cause any benefit, advantage, or solution to occur or become more pronounced are not to be construed as a critical, required, or essential features or elements of any or all the claims.

What is claimed is:

1. A method for an electronic device, the method comprising:

merging, by one or more processors of the electronic device:

a subset of display brightness and corresponding ambient light value pairs selected from a brightness adjustment model defining a plurality of display brightness values corresponding to a plurality of ambient light values on a one-to-one basis stored in a memory of the electronic device; and one or more user defined display brightness and corresponding ambient light value pairs to obtain a merged brightness adjustment model dataset; and filtering, by the one or more processors, the merged brightness adjustment model dataset to obtain a filtered brightness adjustment model dataset.

2. The method of claim 1, further comprising extracting, by the one or more processors, a merged brightness adjustment model from the filtered brightness adjustment model dataset.

3. The method of claim 2, further comprising controlling, by the one or more processors, a display brightness of a display of the electronic device using the merged brightness adjustment model.

4. The method of claim 3, wherein the controlling the display brightness of the electronic device using the merged brightness adjustment model adjusts the display brightness to a level defined by the merged brightness adjustment model and an ambient light level of an environment of the electronic device.

5. The method of claim 4, wherein the merging comprises applying an isotonic regression to a combination of the subset of display brightness and corresponding ambient light value pairs and the one or more user defined display brightness and corresponding ambient light value pairs.

6. The method of claim 5, wherein the filtering comprises applying a Gaussian filter to the merged brightness adjustment model dataset to obtain the filtered brightness adjustment model dataset.

7. The method of claim 6, wherein the Gaussian filter comprises a one-dimensional Gaussian convolution model.

8. The method of claim 5, wherein the filtering comprises applying an average of even instances of the merged brightness adjustment model dataset and odd instances of the merged brightness adjustment model dataset to obtain the filtered brightness adjustment model dataset.

9. The method of claim 5, wherein the extracting comprises applying a monotonic cubic spline to the filtered brightness adjustment model dataset to obtain the merged brightness adjustment model.

10. The method of claim 9, further comprising, prior to the extracting, weighting instances of the filtered brightness adjustment model dataset as a function of a difference between at least one display brightness and corresponding ambient light value pair and at least one corresponding user defined display brightness and corresponding ambient light value pair.

11. The method of claim 10, wherein the weighting occurs as an inverse of the difference between the at least one display brightness and corresponding ambient light value pair and the at least one corresponding user defined display brightness and corresponding ambient light value pair.

12. An electronic device, comprising:

a memory storing a brightness adjustment model defining a plurality of display brightness values corresponding to a plurality of ambient light values on a one-to-one basis;

a display; and one or more processors operable with the display and controlling a display brightness level;

the one or more processors combining, using an isotonic regression model, some display brightness values corresponding to some ambient light values selected from the brightness adjustment model with at least one user defined display brightness and at least one sensed ambient light value to obtain a merged brightness adjustment model and adjusting the display brightness level as a function of a sensed ambient light level measured by a light sensor and the merged brightness adjustment model.

13. The electronic device of claim 12, wherein the merged brightness adjustment model is a non-decreasing, monotonic function for a set of increasing ambient light values.

14. The electronic device of claim 13, the one or more processors, prior to adjusting the display brightness level as the function of the sensed ambient light level measured by the light sensor and the merged brightness adjustment model, filtering a merged brightness adjustment model dataset obtained from the some display brightness values corresponding to the some ambient light values selected from the brightness adjustment model with the at least one user defined display brightness and at least one sensed ambient light value to obtain a filtered brightness adjustment model dataset and extracting the merged brightness adjustment model from the filtered brightness adjustment model dataset.

15. The electronic device of claim 14, the display comprising an organic light emitting diode display, the merged brightness adjustment model defining a number of nits per pixel of the organic light emitting diode display for each ambient light value of the set of increasing ambient light values.

16. The electronic device of claim 12, the one or more processors further repeating the combining the some display brightness values corresponding to the some ambient light values selected from the brightness adjustment model with the at least one user defined display brightness and the at least one sensed ambient light value to obtain the merged brightness adjustment model and the adjusting the display brightness level as the function of the sensed ambient light level measured by the light sensor and the merged brightness adjustment model multiple times within a twenty-four hour period.

17. The electronic device of claim 16, wherein:

the at least one user defined display brightness and the at least one sensed ambient light value employed during a final repeat of the combining the some display brightness values corresponding to the some ambient light values selected from the brightness adjustment model with the at least one user defined display brightness and the at least one sensed ambient light value to obtain the merged brightness adjustment model and the adjusting the display brightness level as the function of the sensed ambient light level measured by the light sensor and the merged brightness adjustment model comprises all user defined display brightness and corresponding sensed ambient light values received during the twenty-four hour period; and all other repeats of the combining the some display brightness values corresponding to the some ambient light values selected from the brightness adjustment model with the at least one user defined display brightness and the at least one sensed ambient light value to obtain the merged brightness adjustment model and the adjusting the display brightness level as the function of the sensed ambient light level measured by the light sensor and the merged brightness adjustment model use fewer than the all user defined display brightness and the corresponding ambient light values received during the twenty-four hour period.

18. A method for an electronic device, the method comprising:

selecting, by one or more processors of the electronic device, a subset of display brightness and ambient light value pairs from a brightness adjustment model;

combining, by the one or more processors, the subset of display brightness and ambient light value pairs and one or more user defined display brightness and ambient light value pairs using an isotonic regression model to obtain a combined brightness adjustment model dataset defining a non-decreasing, monotonic function;

filtering, by the one or more processors, the combined brightness adjustment model dataset to obtain a filtered brightness adjustment model dataset;

extracting, by the one or more processors, a merged brightness adjustment model from the filtered brightness adjustment model dataset using a monotonic cubic spline; and controlling, by the one or more processors, an output brightness of a display of the electronic device as a function of the merged brightness adjustment model.

19. The method of claim 18, wherein the filtering comprises applying a one-dimensional Gaussian convolution model to the combined brightness adjustment model dataset.

20. The method of claim 18, wherein the filtering comprises applying an average of even instances of the subset of display brightness and ambient light value pairs and odd instances of the subset of display brightness and ambient light value pairs to the combined brightness adjustment model dataset, further comprising weighting instances of the filtered brightness adjustment model dataset as a function of a difference between at least one display brightness and corresponding ambient light value pair and at least one corresponding user defined display brightness and corresponding ambient light value pair.

* * * * *